US009275326B2

(12) United States Patent
Piekniewski et al.

(10) Patent No.: US 9,275,326 B2
(45) Date of Patent: Mar. 1, 2016

(54) RATE STABILIZATION THROUGH PLASTICITY IN SPIKING NEURON NETWORK

(71) Applicant: Brain Corporation, San Diego, CA (US)

(72) Inventors: Filip Piekniewski, San Diego, CA (US);
Micah Richert, San Diego, CA (US);
Dimitry Fisher, San Diego, CA (US);
Eugene Izhikevich, San Diego, CA (US)

(73) Assignee: Brain Corporation, San Diego, CA (US)

( * ) Notice: Subject to any disclaimer, the term of this patent is extended or adjusted under 35 U.S.C. 154(b) by 368 days.

(21) Appl. No.: 13/691,554

(22) Filed: Nov. 30, 2012

(65) Prior Publication Data

US 2014/0156574 A1    Jun. 5, 2014

(51) Int. Cl.
*G06F 15/18* (2006.01)
*G06N 3/02* (2006.01)
*G06N 3/04* (2006.01)

(52) U.S. Cl.
CPC . *G06N 3/02* (2013.01); *G06N 3/049* (2013.01)

(58) Field of Classification Search
None
See application file for complete search history.

(56) References Cited

U.S. PATENT DOCUMENTS

| 5,063,603 A | 11/1991 | Burt |
| 5,138,447 A | 8/1992 | Shen et al. |
| 5,216,752 A | 6/1993 | Tam |
| 5,272,535 A | 12/1993 | Elabd |
| 5,355,435 A | 10/1994 | Deyong et al. |
| 5,638,359 A | 6/1997 | Peltola et al. |
| 5,652,594 A | 7/1997 | Costas |
| 5,673,367 A | 9/1997 | Buckley |
| 5,875,108 A | 2/1999 | Hoffberg |
| 6,009,418 A | 12/1999 | Cooper |

(Continued)

FOREIGN PATENT DOCUMENTS

| CN | 102226740 A | 10/2011 |
| JP | 4087423 | 3/1992 |

(Continued)

OTHER PUBLICATIONS

Berkes and Wiskott, Slow feature analysis yields a rich repertoire of complex cell properties. *Journal of Vision* (2005) vol. 5 (6).

(Continued)

*Primary Examiner* — Li-Wu Chang
(74) *Attorney, Agent, or Firm* — Gazdzinski & Associates, PC

(57) ABSTRACT

Apparatus and methods for activity based plasticity in a spiking neuron network adapted to process sensory input. In one embodiment, the plasticity mechanism may be configured for example based on activity of one or more neurons providing feed-forward stimulus and activity of one or more neurons providing inhibitory feedback. When an inhibitory neuron generates an output, inhibitory connections may be potentiated. When an inhibitory neuron receives inhibitory input, the inhibitory connection may be depressed. When the inhibitory input arrives subsequent to the neuron response, the inhibitory connection may be depressed. When input features are unevenly distributed in occurrence, the plasticity mechanism is capable of reducing response rate of neurons that develop receptive fields to more prevalent features. Such functionality may provide network output such that rarely occurring features are not drowned out by more widespread stimulus.

18 Claims, 17 Drawing Sheets

(56) References Cited

U.S. PATENT DOCUMENTS

| | | | |
|---|---|---|---|
| 6,014,653 A | 1/2000 | Thaler |
| 6,035,389 A | 3/2000 | Grochowski |
| 6,418,424 B1 | 7/2002 | Hoffberg et al. |
| 6,458,157 B1 | 10/2002 | Suaning |
| 6,509,854 B1 | 1/2003 | Morita |
| 6,545,705 B1 | 4/2003 | Sigel et al. |
| 6,545,708 B1 | 4/2003 | Tamayama |
| 6,546,291 B2 | 4/2003 | Merfield et al. |
| 6,581,046 B1 | 6/2003 | Ahissar |
| 6,625,317 B1 | 9/2003 | Gaffin et al. |
| 7,054,850 B2 | 5/2006 | Matsugu |
| 7,565,203 B2 | 7/2009 | Greenberg et al. |
| 7,580,907 B1 | 8/2009 | Rhodes |
| 7,653,255 B2 | 1/2010 | Rastogi |
| 7,737,933 B2 | 6/2010 | Yamano et al. |
| 7,765,029 B2 | 7/2010 | Fleischer et al. |
| 7,849,030 B2 | 12/2010 | Ellingsworth |
| 8,000,967 B2 | 8/2011 | Taleb |
| 8,015,130 B2 | 9/2011 | Matsugu |
| 8,103,602 B2 | 1/2012 | Izhikevich |
| 8,154,436 B2 | 4/2012 | Szajnowski |
| 8,160,354 B2 | 4/2012 | Paquier |
| 8,200,593 B2 | 6/2012 | Guillen |
| 8,281,997 B2 | 10/2012 | Moran et al. |
| 8,311,965 B2 | 11/2012 | Breitwisch |
| 8,315,305 B2 | 11/2012 | Petre |
| 8,346,692 B2 | 1/2013 | Rouat et al. |
| 8,390,707 B2 | 3/2013 | Yamashita |
| 8,416,847 B2 | 4/2013 | Roman |
| 8,467,623 B2 | 6/2013 | Izhikevich |
| 8,515,160 B1 | 8/2013 | Khosla et al. |
| 8,583,286 B2 | 11/2013 | Fleischer et al. |
| 8,712,939 B2 | 4/2014 | Szatmary et al. |
| 8,712,941 B2 | 4/2014 | Izhikevich et al. |
| 8,719,199 B2 | 5/2014 | Izhikevich et al. |
| 8,725,658 B2 | 5/2014 | Izhikevich et al. |
| 8,725,662 B2 | 5/2014 | Izhikevich et al. |
| 8,756,183 B1 | 6/2014 | Daily et al. |
| 8,775,341 B1 | 7/2014 | Commons |
| 8,793,205 B1 | 7/2014 | Fisher et al. |
| 8,943,008 B2 | 1/2015 | Ponulak et al. |
| 8,972,315 B2 | 3/2015 | Szatmary et al. |
| 8,977,582 B2 | 3/2015 | Richert |
| 8,983,216 B2 | 3/2015 | Izhikevich et al. |
| 8,990,133 B1 | 3/2015 | Ponulak et al. |
| 8,996,177 B2 | 3/2015 | Coenen |
| 2002/0038294 A1 | 3/2002 | Matsugu |
| 2003/0050903 A1 | 3/2003 | Liaw et al. |
| 2003/0216919 A1 | 11/2003 | Roushar |
| 2003/0222987 A1 | 12/2003 | Karazuba |
| 2004/0054964 A1 | 3/2004 | Bozdagi |
| 2004/0136439 A1 | 7/2004 | Dewberry |
| 2004/0170330 A1 | 9/2004 | Fogg |
| 2004/0193670 A1 | 9/2004 | Langan et al. |
| 2004/0220082 A1 | 11/2004 | Surmeier et al. |
| 2005/0015351 A1 | 1/2005 | Nugent |
| 2005/0036649 A1 | 2/2005 | Yokono et al. |
| 2005/0096539 A1 | 5/2005 | Leibig |
| 2005/0283450 A1 | 12/2005 | Matsugu |
| 2006/0094001 A1 | 5/2006 | Torre |
| 2006/0129728 A1 | 6/2006 | Hampel |
| 2006/0161218 A1 | 7/2006 | Danilov |
| 2007/0022068 A1 | 1/2007 | Linsker |
| 2007/0176643 A1 | 8/2007 | Nugent |
| 2007/0208678 A1 | 9/2007 | Matsugu |
| 2008/0100482 A1 | 5/2008 | Lazar |
| 2008/0174700 A1 | 7/2008 | Takaba |
| 2008/0199072 A1 | 8/2008 | Kondo |
| 2008/0201282 A1 | 8/2008 | Garcia et al. |
| 2008/0237446 A1 | 10/2008 | Oshikubo |
| 2009/0043722 A1 | 2/2009 | Nugent |
| 2009/0287624 A1 | 11/2009 | Rouat |
| 2010/0036457 A1 | 2/2010 | Sarpeshkar |
| 2010/0081958 A1 | 4/2010 | She |
| 2010/0086171 A1 | 4/2010 | Lapstun |
| 2010/0100482 A1 | 4/2010 | Hardt |
| 2010/0166320 A1 | 7/2010 | Paquier |
| 2010/0225824 A1 | 9/2010 | Lazar |
| 2010/0235310 A1 | 9/2010 | Gage et al. |
| 2010/0299296 A1 | 11/2010 | Modha et al. |
| 2011/0016071 A1 | 1/2011 | Guillen |
| 2011/0119214 A1 | 5/2011 | Breitwisch |
| 2011/0119215 A1 | 5/2011 | Elmegreen |
| 2011/0134242 A1 | 6/2011 | Loubser |
| 2011/0137843 A1 | 6/2011 | Poon et al. |
| 2011/0160741 A1 | 6/2011 | Asano |
| 2011/0184556 A1 | 7/2011 | Seth et al. |
| 2011/0206122 A1 | 8/2011 | Lu |
| 2011/0235698 A1 | 9/2011 | Petre et al. |
| 2012/0011090 A1 | 1/2012 | Tang |
| 2012/0083982 A1 | 4/2012 | Bonefas |
| 2012/0084240 A1 | 4/2012 | Esser et al. |
| 2012/0109866 A1 | 5/2012 | Modha |
| 2012/0117012 A1 | 5/2012 | Szatmary et al. |
| 2012/0303091 A1 | 11/2012 | Izhikevich |
| 2012/0308076 A1 | 12/2012 | Piekniewski |
| 2012/0308136 A1 | 12/2012 | Izhikevich |
| 2012/0330872 A1 | 12/2012 | Esser et al. |
| 2013/0046716 A1 | 2/2013 | Chan et al. |
| 2013/0073484 A1 | 3/2013 | Izhikevich |
| 2013/0073491 A1 | 3/2013 | Izhikevich |
| 2013/0073492 A1 | 3/2013 | Izhikevich |
| 2013/0073495 A1 | 3/2013 | Izhikevich |
| 2013/0073496 A1 | 3/2013 | Szatmary |
| 2013/0073498 A1 | 3/2013 | Izhikevich |
| 2013/0073499 A1 | 3/2013 | Izhikevich |
| 2013/0073500 A1 | 3/2013 | Szatmary |
| 2013/0103626 A1 | 4/2013 | Hunzinger |
| 2013/0117212 A1 | 5/2013 | Hunzinger et al. |
| 2013/0151450 A1 | 6/2013 | Ponulak |
| 2013/0204814 A1 | 8/2013 | Hunzinger et al. |
| 2013/0204820 A1* | 8/2013 | Hunzinger et al. ............. 706/25 |
| 2013/0218821 A1 | 8/2013 | Szatmary |
| 2013/0251278 A1 | 9/2013 | Izhikevich |
| 2013/0297539 A1 | 11/2013 | Piekniewski et al. |
| 2013/0297541 A1* | 11/2013 | Piekniewski et al. ........... 706/26 |
| 2013/0297542 A1 | 11/2013 | Piekniewski et al. |
| 2013/0304683 A1 | 11/2013 | Lo |
| 2013/0325766 A1 | 12/2013 | Petre et al. |
| 2013/0325768 A1 | 12/2013 | Sinyavskiy |
| 2013/0325773 A1 | 12/2013 | Sinyavskiy |
| 2013/0325774 A1 | 12/2013 | Sinyavskiy |
| 2013/0325775 A1 | 12/2013 | Sinyavskiy |
| 2013/0325777 A1 | 12/2013 | Petre et al. |
| 2014/0012788 A1 | 1/2014 | Piekniewski |
| 2014/0016858 A1 | 1/2014 | Richert |
| 2014/0032458 A1 | 1/2014 | Sinyavskiy |
| 2014/0032459 A1 | 1/2014 | Sinyavskiy |
| 2014/0052679 A1 | 2/2014 | Sinyavskiy |
| 2014/0064609 A1 | 3/2014 | Petre et al. |
| 2014/0122397 A1 | 5/2014 | Richert |
| 2014/0122398 A1 | 5/2014 | Richert |
| 2014/0122399 A1 | 5/2014 | Szatmary |
| 2014/0156574 A1 | 6/2014 | Piekniewski |
| 2015/0005937 A1 | 1/2015 | Ponulak |
| 2015/0120626 A1 | 4/2015 | Gupta |

FOREIGN PATENT DOCUMENTS

| | | |
|---|---|---|
| RU | 2108612 C1 | 10/1998 |
| RU | 2406105 C2 | 12/2010 |
| RU | 2424561 C2 | 7/2011 |
| WO | 2008083335 A2 | 7/2008 |
| WO | 2008132066 A1 | 11/2008 |

OTHER PUBLICATIONS

Bohte, 'Spiking Nueral Networks' Doctorate at the University of Leiden, Holland, Mar. 5, 2003, pp. 1-133 [retrieved on Nov. 14, 2012]. Retrieved from the internet: <URL: http://holnepages, cwi,n11-sbolltedmblica6ond)hdthesislxif>.

Brette et al., Brian: a simple and flexible simulator for spiking neural networks, The Neuromorphic Engineer, Jul. 1, 2009, pp. 1-4, doi: 10.2417/1200906.1659.

(56) References Cited

OTHER PUBLICATIONS

Cessac et al. 'Overview of facts and issues about neural coding by spikes.' Journal of Physiology, Paris 104.1 (2010): 5.
Cuntz et al., 'One Rule to Grow Them All: A General Theory of Neuronal Branching and Its Paractical Application' PLOS Computational Biology, 6 (8), Published Aug. 5, 2010.
Davison et al., PyNN: a common interface for neuronal network simulators, Frontiers in Neuroinformatics, Jan. 2009, pp. 1-10, vol. 2, Article 11.
Djurfeldt, Mikael, The Connection-set Algebra: a formalism for the representation of connectivity structure in neuronal network models, implementations in Python and C++, and their use in simulators BMC Neuroscience Jul. 18, 2011 p. 1 12(Suppl 1):p. 80.
Dorval et al. 'Probability distributions of the logarithm of inter-spike intervals yield accurate entropy estimates from small datasets.' Journal of neuroscience methods 173.1 (2008): 129.
Fidjeland et al., Accelerated Simulation of Spiking Neural Networks Using GPUs [online],2010 [retrieved on Jun. 15, 2013], Retrieved from the Internet: URL:http://ieeexplore.ieee.org/xpls/abs_all.jsp?ammber=5596678&tag=1.
Field, G.; Chichilnisky, E., Information Processing in the Primate Retina: Circuitry and Coding. *Annual Review of Neuroscience*, 2007, 30(1), 1-30.
Fiete, et al., Spike-Time-Dependent Plasticity and Heterosynaptic Competition Organize Networks to Produce Long Scale-Free Sequences of Neural Activity. *Neuron 65*, Feb. 25, 2010, pp. 563-576.
Floreano et al., 'Neuroevolution: from architectures to learning' Evol. Intel. Jan. 2008 1:47-62, [retrieved Dec. 30, 2013] [retrieved online from URL:<http://inforscience.epfl.ch/record/112676/files/FloreanoDuerrMattiussi2008.p df>.
Földiák, P., Learning invariance from transformation sequences. *Neural Computation*, 1991, 3(2), 194-200.
Froemke et al., Temporal modulation of spike-timing-dependent plasticity, Frontiers in Synaptic Neuroscience, vol. 2, Article 19, pp. 1-16 [online] Jun. 2010 [retrieved on Dec. 16, 2013]. Retrieved from the internet: <frontiersin.org>.
Gerstner et al. (1996) A neuronal learning rule for sub-millisecond temporal coding. *Nature* vol. 383 (6595) pp. 76-78.
Gewaltig et al., 'NEST (Neural Simulation Tool)', Scholarpedia, 2007, pp. 1-15, 2(4): 1430, doi: 1 0.4249/scholarpedia.1430.
Gleeson et al., NeuroML: A Language for Describing Data Driven Models of Neurons and Networks with a High Degree of Biological Detail, PLoS Computational Biology, Jun. 2010, pp. 1-19 vol. 6 Issue 6.
Gluck, Stimulus Generalization and Representation in Adaptive Network Models of Category Learning [online], 1991 [retrieved on Aug. 24, 2013]. Retrieved from the Internet:<URL:http://www.google.com/url?sa=t&rct=j&q=Giuck+%22STIMULUS+GENERALIZATION+AND+REPRESENTATION+1N+ADAPTIVE+NETWORK+MODELS+OF+CATEGORY+LEARN I NG%22+ 1991.
Gollisch et al. 'Rapid neural coding in the retina with relative spike latencies.' Science 319.5866 (2008): 11 08-1111.
Goodman et al., Brian: a simulator for spiking neural networks in Python, Frontiers in Neuroinformatics, Nov. 2008, pp. 1-10, vol. 2, Article 5.
Gorchetchnikov et al., NineML: declarative, mathematically-explicit descriptions of spiking neuronal networks, Frontiers in Neuroinformatics, Conference Abstract: 4th INCF Congress of Neuroinformatics, doi: 1 0.3389/conf.fninf.2011.08.00098.
Graham, Lyle J., The Surf-Hippo Reference Manual, http:// www.neurophys.biomedicale.univparis5.    fr/-graham/surf-hippo-files/Surf-Hippo%20Reference%20Manual.pdf, Mar. 2002, pp. 1-128.
Hopfield JJ (1995) Pattern recognition computation using action potential timing for stimulus representation. *Nature* 376: 33-36.
Izhikevich E. M. and Hoppensteadt F.C. (2009) Polychronous Wavefront Computations. *International Journal of Bifurcation and Chaos*, 19:1733-1739.
Izhikevich E.M. (2004) Which Model to Use for Cortical Spiking Neurons? *IEEE Transactions on Neural Networks*, 15:1063-1070.
Izhikevich E.M. (2006) Polychronization: Computation With Spikes. *Neural Computation*,18:245-282.
Izhikevich et al., 'Relating STDP to BCM', Neural Computation (2003) 15, 1511-1523.
Izhikevich, E.M. (2007) Dynamical Systems in Neuroscience: The Geometry of Excitability and Bursting, *The MIT Press*, 2007.
Izhikevich, 'Simple Model of Spiking Neurons', IEEE Transactions on Neural Networks, vol. 14, No. 6, Nov. 2003, pp. 1569-1572.
Janowitz, M.K.; Van Rossum, M.C.W. Excitability changes that complement Hebbian learning. *Network, Computation in Neural Systems*, 2006, 17 (1), 31-41.
Karbowski et al., 'Multispikes and Synchronization in a Large Neural Network with Temporal Delays', Neural Computation 12, 1573-1606 (2000).
Khotanzad, Alireza, Classification of invariant image representations using a neural network, IEEF. Transactions on Acoustics, Speech, and Signal Processing vol. 38 No. 6 Jun. 1990 pp. 1028-1038.
Khotanzad, 'Classification of invariant image representations using a neural network' IEEF. Transactions on Acoustics, Speech, and Signal Processing, vol. 38, No. 6, Jun. 1990, pp. 1028-1038 [online], [retrieved on Dec. 10, 2013]. Retrieved from the Internet <URL: http://www-ee.uta.edu/eeweb/IP/Courses/SPR/Reference/Khotanzad.pdf>.
Knoblauch, et al. Memory Capacities for Synaptic and Structural Plasticity, *Neural Computation* 2009, pp. 1-45.
Laurent, 'Issue 1—nnql—Refactor Nucleus into its own file—Neural Network Query Language' [retrieved on Nov. 12, 2013]. Retrieved from the Internet: URL:https:// code.google.com/p/nnql/issues/detail?id=1.
Laurent, 'The Neural Network Query Language (NNQL) Reference' [retrieved on Nov. 12, 2013]. Retrieved from the Internet: <URL'https://code.google.com/p/nnql/issues/detail?id=1>.
Lazar et al. 'A video time encoding machine', in Proceedings of the 15th IEEE International Conference on Image Processing (ICIP '08), 2008, pp. 717-720.
Lazar et al.,'Consistent recovery of sensory stimuli encoded with MIMO neural circuits.' Computational intelligence and neuroscience (2010): 2.
Lazar et al. 'Multichannel time encoding with integrate-and-fire neurons.' Neurocomputing 65 (2005): 401-407.
Masquelier and Thorpe, Learning to recognize objects using waves of spikes and Spike Timing-Dependent Plasticity. *Neural Networks* (IJCNN), *The 2010 International Joint Conference on DOI*—10.1109/IJCNN.2010.5596934 (2010) pp. 1-8.
Masquelier, Timothee. 'Relative spike time coding and STOP-based orientation selectivity in the early visual system in natural continuous and saccadic vision: a computational model.' Journal of computational neuroscience 32.3 (2012): 425-441.
Meister, M., Multineuronal codes in retinal signaling. *Proceedings of the National Academy of sciences*. 1996, 93, 609-614.
Meister, M.; Berry, M.J. The neural code of the retina, *Neuron*. 1999, 22, 435-450.
Nichols, A Re configurable Computing Architecture for Implementing Artificial Neural Networks on FPGA, Master's Thesis, The University of Guelph, 2003, pp. 1-235.
Oster M., Lichtsteiner P., Delbruck T, Liu S. A Spike-Based Saccadic Recognition System. *ISCAS 2007. IEEE International Symposium on Circuits and Systems*, 2009, pp. 3083-3086.
Paugam-Moisy et al. 'Computing with spiking neuron networks.' Handbook of Natural Computing, 40 p. Springer, Heidelberg (2009).
Paugam-Moisy et al., "Computing with spiking neuron networks" G. Rozenberg T. Back, J. Kok (Eds.), Handbook of Natural Computing, Springer-Verlag (2010) [retrieved Dec. 30, 2013], [retrieved online from link.springer.com].
Pavlidis et al. Spiking neural network training using evolutionary algorithms. In: Proceedings 2005 IEEE International Joint Conference on Neural Networkds, 2005. IJCNN'05, vol. 4, pp. 2190-2194 Publication Date Jul. 31, 2005 [online] [Retrieved on Dec. 10, 2013] Retrieved from the Internet <URL: http://citeseerx.ist.psu.edu/viewdoc/download?doi=10.1.1.5.4346&rep=rep1&type=pdf.

(56) References Cited

OTHER PUBLICATIONS

Rekeczky, et al., "Cellular Multiadaptive Analogic Architecture: A Computational Framework for UAV Applications." May 2004.
Revow M., Williams C., and Hinton, G.E., 1996, Using Generative Models for Handwritten Digit Recognition, *IEEE Trans. on Pattern Analysis and Machine Intelligence*, 18, No. 6, Jun. 1996.
Sanchez, Efficient Simulation Scheme for Spiking Neural Networks, *Doctoral Thesis*, Universita di Granada Mar. 28, 2008, pp. 1-104.
Sato et al., 'Pulse interval and width modulation for video transmission.' Cable Television, IEEE Transactions on 4 (1978): 165-173.
Schemmel, J., et al. Implementing synaptic plasticity in a VLSI spiking neural network model, Proceedings of the 2006 International Joint Conference on Neural Networks, Jul. 2006 pp. 1-6.
Schnitzer, M.J.; Meister, M.; Multineuronal Firing Patterns in the Signal from Eye to Brain. *Neuron*, 2003, 37, 499-511.
Serrano-Gotarredona, et al, "On Real-Time: AER 2-D Convolutions Hardware for Neuromorphic Spike-based Cortical Processing", Jul. 2008.
simulink.rtm. model [online], [Retrieved on Dec. 10, 2013] Retrieved from <URL: http://www.mathworks.com/ products/simulink/index.html.gt.
Sinyavskiy et al. 'Reinforcement learning of a spiking neural network in the task of control of an agent in a virtual discrete environment' Rus. J. Nonlin. Dyn., 2011, vol. 7, No. 4 (Mobile Robots), pp. 859-875, chapters 1-8 (Russian Article with English Abstract).
Sjostrom et al., 'Spike-Timing Dependent Plasticity' Scholarpedia, 5(2):1362 (2010), pp. 1-18.
Szatmary et al., 'Spike-timing Theory of Working Memory' PLoS Computational Biology, vol. 6, Issue 8, Aug. 19, 2010 [retrieved on Dec. 30, 2013]. Retrieved from the Internet: <URL: http://www.ploscompbiol.org/article/info%3Adoi% 2F10.1371 %2Fjournal.pcbi.10008 79#>.
Thomas S. and Riesenhuber, M, 2004, Realistic Modeling of Simple and Complex Cell Tuning in the HMAX Model, and Implications for Invariant Object Recognition in Cortex, *Al Memo* 2004-017 Jul. 2004.
Thorpe, S.J., Delorme, A. & Vanrullen, R. (2001). Spike-based strategies for rapid processing. *Neural Networks* 14, pp. 715-725.
Thorpe, S.J., Guyonneau, R., Guilbaud, N., Allegraud, J-M. & Vanrullen, R. (2004). SpikeNet: real-time visual processing with one spike per neuron. *Neurocomputing*, 58-60, pp. 857-864.
Tim Gollisch and Markus Meister (2008) Rapid Neural Coding in the Retina with Relative Spike Latencies. *Science* 319:1108-1111.
Van Rullen R.; Thorpe, S. Rate Coding versus temporal order coding: What the Retinal ganglion cells tell the visual cortex. *Neural computation*, 2001, 13, 1255-1283.
Vanrullen, R. & Koch, C. (2003). Is perception discrete or continuous? *Trends in Cognitive Sciences* 7(5), pp. 207-213.
Vanrullen, R., Guyonneau, R. & Thorpe, S.J. (2005). Spike times make sense. *Trends in Neurosciences* 28(1).
Wallis, G.; Rolls, E. T. A model of invariant object recognition in the visual system. *Progress in Neurobiology*. 1997, 51, 167-194.
Wang, 'The time dimension for scene analysis.' Neural Networks, IEEE Transactions on 16.6 (2005): 1401-1426.
Wiskott, L.; Sejnowski, T.J. Slow feature analysis: Unsupervised learning of invariances. *Neural Computation*, 2002, 14, (4), 715-770.
Zarandy, et al., "Bi-i: A Standalone Ultra High Speed Cellular Vision System", Jun. 2005.
Stringer, et al., "Invariant Object Recognition in the Visual System with Novel Views of 3D Objects", 2002, 2585-2596, 12 pages.
Wiskott, et al., "Slow Feature Analysis", 2002, 29 pages.
Ramachandran, et al., "The Perception of Phantom Limbs", The D.O. Hebb Lecture, Center for Brain and Cognition, University of California, 1998, 121, 1603-1630, 28 pages.
Brette, et al., "Simulation of Networks of Spiking Neurons: A Review of Tools and Strategies", Received Nov. 29, 2006, Revised Apr. 2, 2007, Accepted Apr. 12, 2007, Springer Science, 50 pages.
Izhikevich E.M., "Neural Excitability, Spiking and Bursting", Neurosciences Institute, Received Jun. 9, 1999, Revised Oct. 25, 1999, 1171-1266, 96 pages.

Kazantsev, et al., "Active Spike Transmission in the Neuron Model With a Winding Threshold Maniford", Jan. 3, 2012, 205-211, 7 pages.
Kling-Petersen, PhD, "Sun and HPC: From Systems to PetaScale" Sun Microsystems, no date, 31 pages.
Martinez-Perez, et al., "Automatic Activity Estimation Based on Object Behavior Signature", 2010, 10 pages.
Matsugu, et al., "Convolutional Spiking Neural Network for Robust Object Detection with Population Code Using Structured Pulse Packets", 2004, 39-55, 17 pages.
Chistiakova, Marina, and Maxim Volgushev. "Heterosynaptic plasticity in the neocortex." Experimental brain research 199.3-4 (2009): 377-390.
Knoblauch, Andreas, Gunther Palm, and Friedrich T. Sommer. "Memory capacities for synaptic and structural plasticity." Neural Computation 22.2 (2010): 289-341.
Meinhardt, Hans, and Alfred Gierer. "Pattern formation by local self-activation and lateral inhibition." Bioessays 22.8 (2000): 753-760.
Markram, Henry, et al. "Regulation of synaptic efficacy by coincidence of postsynaptic APs and EPSPs." Science 275.5297 (1997): 213-215.
Swiercz, Waldemar, et al. "A new synaptic plasticity rule for networks of spiking neurons." Neural Networks, IEEE Transactions on 17.1 (2006) 94-105.
Li, Zhaoping. "A saliency map in primary visual cortex." Trends in cognitive sciences 6.1 (2002): 9-16.
Itti, Laurent, and Christof Koch. "Computational modelling of visual attention." Nature reviews neuroscience 2.3 (2001): 194-203.
Izhikevich, Eugene M. Dynamical systems in neuroscience: chapters 1 and 2. MIT press. 2007.
Wu, QingXiang, et al. "Remembering Key Features of Visual Images based on Spike Timing Dependent Plasticity of Spiking Neurons." Image and Signal Processing, 2009. CISP '09. $2^{nd}$ International Congress on. IEEE. 2009.
Izhikevich, Eugene M. "Simple model of spiking neurons." IEEE Transactions on neural networks. 14.6 (2003): 1569-1572.
Fiete, et al. "Spike-time-dependent plasticity and heterosynaptic competition organize networks to produce long scale-free sequences of neural activity." Neuron 65.4 (2010): 563-576.
Bush, Daniel, "STDP, Rate-coded Hebbian Learning and Auto-Associative Network Models of the Hippocampus", Sep. 2008, University of Sussex, pp. 1-109.
Florian03, Biologically inspired neural networks for the control of embodied agents, Technical Report Coneural—03-03 Version 1.0 [online], Nov. 30, 2003 [retrieved on Nov. 24, 2014]. Retrieved from the Internet: <URL:http://citeseerx.ist.psu.edu/viewdoc/download?doi=10.1.1.216.4931&rep1&type=pdf>.
Glackin, C.; Maguire, L.; McDaid, L., Feature extraction from spectra-temporal signals using dynamic synapses, recurrency, and lateral inhibition, Neural Networks (IJCNN), The 2010 International Joint Conference on DOI: 10.1109/IJCNN.2010.5596818 Publication Year: 2010, pp. 1-6.
Leydesdorff, Loet and Stephen Bensman, Classification and Powerlaws: The Logarithmic Transformation (2006), Journal of the American Society for Information Science and Technology (forthcoming).
Medini, C.; Subramaniyam, S.; Nair, B.; Diwakar, S., Modeling cerebellar granular layer excitability and combinatorial computation with spikes, Bio-Inspired Computing: Theories and Applications (BIC-TA), 2010 IEEE Fifth International Conference on DOI: 10.1109/BICTA.201 0.5645274, Publication Year: 2010, pp. 1495-1503.
Niv, et al., Evolution of Reinforcement Learning in Uncertain Environments: A Simple Explanation for Complex Foraging Behaviors, International Society for Adaptive Behavior, 2002, vol. 10(1), pp. 5-24.
Ostojic, Srdjan, Nicolas Brunel, From Spiking Neuron Models to Linear-Nonlinear Models, Jan. 2011,vol. 7, Issue 1, e1001056.
Ruan, Chengmei; Qingxiang Wu; Lijuan Fan; Zhigiang Zhuo; Xiaowei Wang, Competitive behaviors of a spiking neural network with spike timing dependent plasticity, Biomedical Engineering and

(56) References Cited

OTHER PUBLICATIONS

Informatics (BMEI), 2012 5th International Conference on DOI: 10.11 09/BMEI.2012.6513088 Publication Year: 2012, pp. 1015-1019.

Thorpe, Ultra-Rapid Scene Categorization with a Wave of Spikes. In H.H. Bulthoff et al. (eds.), Biologically Motivated Computer Vision, Lecture Notes in Computer Science, 2002, 2525, pp. 1-15, Springer-Verlag, Berlin.

Voutsas, K. ; Adamy, J., A Biologically Inspired Spiking Neural Network for Sound Source Lateralization Neural Networks, IEEE Transactions on vol. 18, Issue: 6 DOI: 10.11 09/TNN.2007.899623, Publication Year: 2007, pp. 1785-1799.

Wade, J.J.; McDaid, L.J.; Santos, J.A.; Sayers, H.M., SWAT: A Spiking Neural Network Training Algorithm for Classification Problems, Neural Networks, IEEE Transactions on vol. 21, Issue: 11 DOI: 10.11 09/TNN.201 0.2074212, Publication Year: 2010, pp. 1817-1830.

Wennekers, T., Analysis of spatia-temporal patterns in associative networks of spiking neurons Artificial Neural Networks, 1999. ICANN 99. Ninth International Conference on (Conf. Publ. No. 470) vol. 1 DOI: 10.1049/cp:19991116 Publication Year: 1999, pp. 245-250, vol. 1.

Wu, QingXiang et al., Edge Detection Based on Spiking Neural Network Model, ICIC 2007, LNAI 4682, pp. 26-34, 2007, Springer-Verlag, Berlin Heidelberg.

Wysoski, Simei Gomes et al., "Fast and adaptive network of spiking neurons for multi-view visual pattern recognition," Neurocomputing, vol. 71, Issues 13-15, Aug. 2008, pp. 2563-2575, ISSN 0925-2312, http://dx.doi.org/10.1016/j.neucom.2007.12.038.

Branka, "A Neural Network for Ego-Motioin Estimation from Optical Flow", published 1995, pp. 247-256.

Hatsopoulos, "Visual Navigation with a Neural Network", published 1991, pp. 303-317.

Huang, "Fall Detection Using Modular Neural Networks with Back-Projected Optical Flow", Published 2007, pp. 415-424.

Masquelier, Timothee, "Learning Mechanisms to Account for Speed, Selectivity and Invariance of Responses in the Visual Cortex", phD Thesis published by U.F.R. Sciences de la Vie et de la Terre, Universite Toulouse III—Paul Sabatier, 2008 pp. 1-194.

Venkateswaran, V, et al, "A Novel Perspective into the Neuronal Encoding Along the Retinal Pathway Employing Time-Frequency Transformation: Part II—For Color", Brain Inspired Cognitive Systems—BICS'2004, Aug. 29-Sep. 1, 2004, University of Stirling, Scotland, UK, Sep. 1, 2004 pp. BIS4-3 1-7.

Vislay-Meltzer, Rebecca, et al. "Spatiotemporal Specificity of Neuronal Activity Directs the Modification of Receptive Fields in the Developing Retinotectal System", Neuron 50, Apr. 6, 2006 pp. 101-114.

Zhou, "Computation of Optical Flow Using a Neural Network" Published 1988, pp. 71-78.

\* cited by examiner

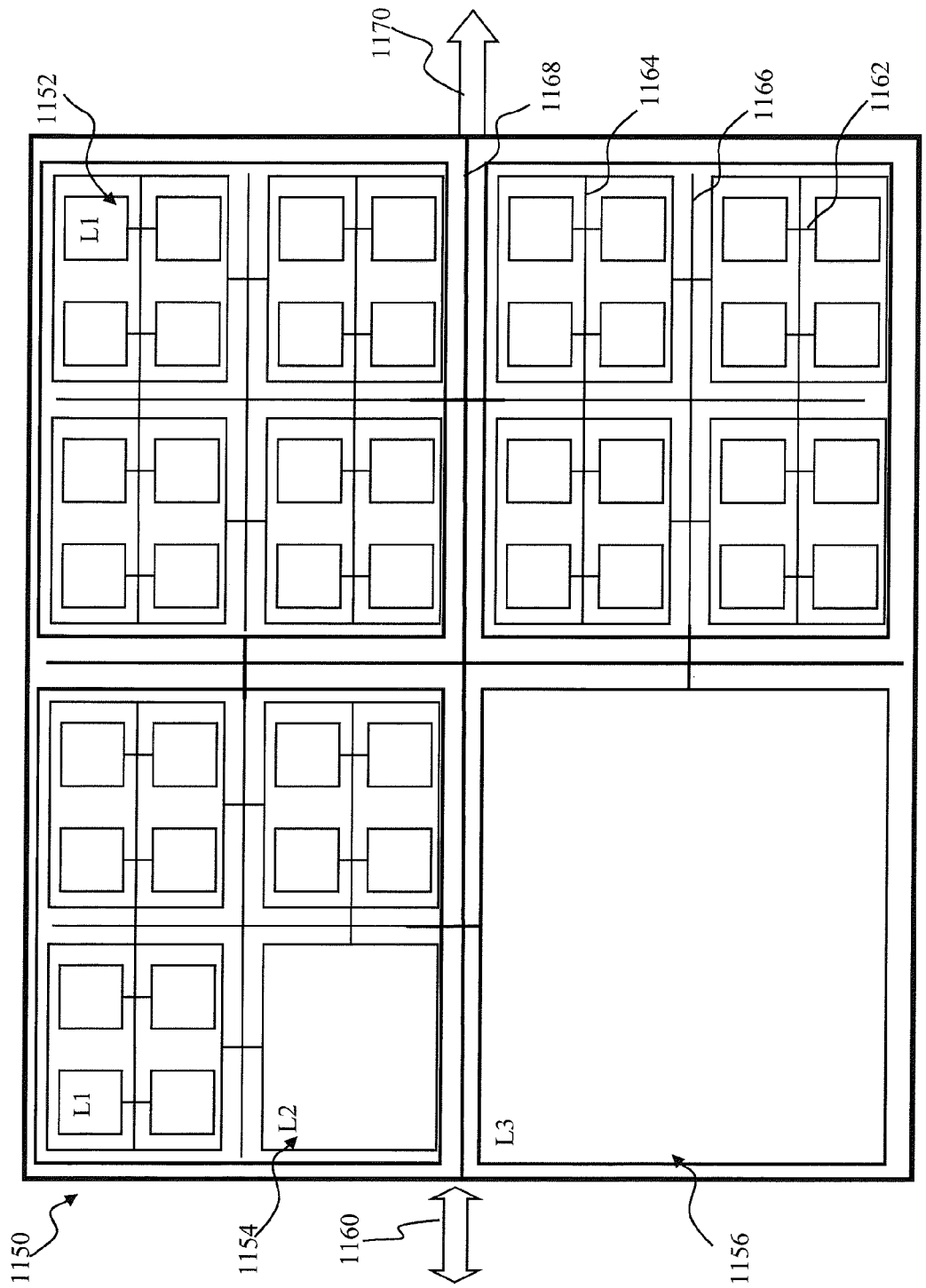

RATE STABILIZATION THROUGH PLASTICITY IN SPIKING NEURON NETWORK

CROSS-REFERENCE TO RELATED APPLICATIONS

This application is related to co-owned U.S. patent application Ser. No. 13/152,119, entitled "SENSORY INPUT PROCESSING APPARATUS AND METHODS", filed on Jun. 2, 2011, now U.S. Patent No. 8,942.466, co-owned and co-pending U.S. patent application Ser. No. 13/465,924, entitled "SPIKING NEURAL NETWORK FEEDBACK APPARATUS AND METHODS", filed May 7, 2012, co-owned and co-pending U.S. patent application Ser. No. 13/465,903 entitled "SENSORY INPUT PROCESSING APPARATUS IN A SPIKING NEURAL NETWORK", filed May 7, 2012, co-owned and co-pending U.S. Patent Application Ser. No. 13/465,918, entitled "SPIKING NEURAL NETWORK OBJECT RECOGNITION APPARATUS AND METHODS", filed May 7, 2012, co-owned and co-pending U.S. patent application Ser. No. 13/488,106, entitled "SPIKING NEURON NETWORK APPARATUS AND METHODS", filed Jun. 4, 2012, co-owned U.S. patent application Ser. No. 13/488,114, entitled "SPIKING NEURON NETWORK APPARATUS AND METHODS", filed Jun. 4, 2012, co-owned and co-pending U.S. patent application Ser. No. 13/541,531, entitled "CONDITIONAL PLASTICITY SPIKING NEURON NETWORK APPARATUS AND METHODS", filed Jul. 3, 2012, co-owned and co-pending U.S. patent application Ser. No. 13/660,923, entitled "ADAPTIVE PLASTICITY APPARATUS AND METHODS FOR SPIKING NEURON NETWORK", filed Oct. 25, 2012, co-owned U.S. patent application Ser. No. 13/660,967, entitled "APPARATUS AND METHODS FOR ACTIVITY-BASED PLASTICITY IN A SPIKING NEURON NETWORK", filed Oct. 25, 2012. now U.S. Pat. No. 8,972,315, co-owned and co-pending U.S. patent application Ser. No. 13/660,982, entitled "SPIKING NEURON SENSORY PROCESSING APPARATUS AND METHODS FOR SALIENCY DETECTION", filed Oct. 25, 2012, and co-owned and co-pending U.S. patent application Ser. No. 13/660,945, entitled "MODULATED PLASTICITY APPARATUS AND METHODS FOR SPIKING NEURON NETWORK", filed Oct. 25, 2012, each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to artificial neural networks, and more particularly in one exemplary aspect to computer apparatus and methods for plasticity implementation in a pulse-code neural network.

2. Description of Related Art

Artificial spiking neural networks are frequently used to gain an understanding of biological neural networks, and for solving artificial intelligence problems. These networks typically employ a pulse-coded mechanism, which encodes information using timing of the pulses. Such pulses (also referred to as "spikes" or 'impulses') are short-lasting (typically on the order of 1-2 ms) discrete temporal events. Several exemplary embodiments of such encoding are described in commonly owned and co-pending U.S. patent application Ser. No. 13/152,084 entitled APPARATUS AND METHODS FOR PULSE-CODE INVARIANT OBJECT RECOGNITION", filed Jun. 2, 2011, and U.S. patent application Ser. No. 13/152,119, Jun. 2, 2011, entitled "SENSORY INPUT PROCESSING APPARATUS AND METHODS", each incorporated herein by reference in its entirety.

Typically, artificial spiking neural networks, such as the exemplary network described in owned U.S. patent application Ser. No. 13/541,531, entitled "CONDITIONAL PLASTICITY SPIKING NEURON NETWORK APPARATUS AND METHODS", may comprise a plurality of units (or nodes), which can be thought of as corresponding to neurons in a biological neural network. Any given unit may be connected to many other units via connections, also referred to as communications channels, and/or synaptic connections. The units providing inputs to any given unit are commonly referred to as the pre-synaptic units, while the units receiving the inputs are referred to as the post-synaptic units.

Each of the unit-to-unit connections may be assigned, inter alia, a connection efficacy, which in general may refer to a magnitude and/or probability of input spike influence on unit output response (i.e., output spike generation/firing). The efficacy may comprise, for example a parameter—e.g., synaptic weight—by which one or more state variables of post-synaptic unit are changed. In one or more implementations, the efficacy may comprise a latency parameter by characterizing propagation delay from a pre-synaptic unit to a post-synaptic unit. In some implementations, greater efficacy may correspond to a shorter latency. During operation of a pulse-code network, neuron responses to input stimulus may be characterized by a firing rate (e.g., a number of spikes per unit time). Individual neurons of such network may be configured to respond to one or more features of the input (e.g., a vertical and/or a horizontal edge, an object of a certain color, and/or other feature). When some of the features (e.g., red circles) may be more prevalent within the input, the neurons with the receptive fields corresponding to the red circles may respond more frequently (e.g., with a higher firing rate) to the input. Such frequent responses may overwhelm or 'drown-out' neurons responding to less frequent/prominent features of the input, and/or lead to an excessive use of network communication, computational, and/or power resources.

Consequently, there is a salient need for improved network operation capable of, inter alia, equalizing firing adaptive plasticity mechanisms to enable a pulse-code (e.g., spiking) neuron network capable of operating in a wide variety of input and network dynamic regimes.

SUMMARY OF THE DISCLOSURE

The present disclosure satisfies the foregoing needs by providing, inter alia, apparatus and methods for implementing plasticity in spiking neuron networks that is capable of, inter alia, stabilization of neuron firing rate.

In a first aspect, an apparatus configured to process input signals in spiking network is disclosed. In one embodiment, the network includes an excitatory and an inhibitory neuron and the apparatus includes a storage apparatus configured to store said spiking network; and logic, in data communication with said storage apparatus. The logic is in one variant configured to, based on an excitatory response by the excitatory neuron, (a) strengthen a connection communicating the excitatory response to the inhibitory neuron; and (b) strengthen a connection communicating an inhibitory response from the inhibitory neuron. In another variant, the logic is further configured to, (i) based on the inhibitory response by the inhibitory neuron, (a) weaken the connection communicating the excitatory response to the inhibitory neuron; and (b) weaken the connection communicating the inhibitory response from the inhibitory neuron.

In a second aspect, a non-transitory computer-readable storage medium having instructions resident thereon is disclosed. In one embodiment, the instructions are executable by one or more processors to implement activity-dependent plasticity in a spiking neuron network signal processing apparatus. The exemplary instructions are configured to, when executed: (i) operate an excitatory network portion configured to generate an excitatory output based at least on the signal; (ii) operate an inhibitory network portion configured to generate an inhibitory output based at least on the excitatory output; and (iii) for a given value of a parameter associated with the signal, adjust an efficacy of one or more connections associated with the inhibitory output. In one variant, the excitatory output is characterized by an excitatory firing rate, and the adjustment is performed so as to substantially equalize the excitatory firing rate of individual neurons of the excitatory network portion.

In a third aspect, a computerized spiking neuron apparatus is disclosed. In one embodiment, the apparatus includes one or more processors configured to execute computer program modules, and the computer program modules are configured to, when executed, cause the one or more processors to: (i) based on generating an output, increase an efficacy of one or more inhibitory connections, the one or more connections configured to provide an inhibitory input to a neuron; and (ii) based on receiving the inhibitory input, reduce the efficacy.

In a fourth aspect, a computerized method of processing input stimulus by a spiking neuron network is disclosed. In one embodiment, the network includes first selectivity and second selectivity neurons, and the method includes: (i) causing the first selectivity neuron to respond to a first feature of the input stimulus, the first selectivity neuron response being characterized by a first rate configured based on a frequency of occurrence of the first feature; (ii) causing the second selectivity neuron to respond to a second feature of the input stimulus, the second selectivity neuron response being characterized by a second rate configured based on a frequency of occurrence of the second feature; and (iii) if the frequency of occurrence of the first feature is greater than the frequency of occurrence of the second feature, applying a rate reduction mechanism configured to reduce the first rate based on one or more response of the second selectivity neurons.

In a fifth aspect, a spiking neural network apparatus is disclosed. In one embodiment, the neural network apparatus comprises, inter alia, excitatory and selectivity neurons.

In a sixth aspect, a input processing method for use in a spiking network is disclosed. In one embodiment, the method comprising adjusting one or more responses based at least in part on, inter alia, excitatory or inhibitory neurons.

In a seventh aspect, a method of adjusting connection efficacy in a neuron network is disclosed. In one embodiment, the method includes based on generating an excitatory output by a neuron, (i) increasing a first efficacy of one or more inhibitory connections providing an inhibitory input to the neuron and (ii) increasing a second efficacy of one or more excitatory connections providing an excitatory output to an inhibitory neuron; and based on receiving the inhibitory input, reducing the first efficacy and reducing the second efficacy.

In an eighth aspect, a neural network system is disclosed. In one embodiment, the system includes a neuron configured to generate an excitatory output; one or more inhibitory neurons configured to provide an inhibitory input, the one or more inhibitory neurons operatively coupled to the neuron via one or more inhibitory connections; and a processor comprising a plurality of instructions configured to, when executed, cause the processor to: based on the generation of the excitatory output by the neuron, increase an efficacy of the one or more inhibitory connections, the one or more inhibitory connections configured to provide an inhibitory input to the neuron; and based on a receipt of the inhibitory input, reduce the efficacy of the one or more inhibitory connections; wherein the increase and the reduction of the efficacy are configured to modify the efficacy of individual ones of the one or more inhibitory connections.

Further features of the present disclosure, its nature and various advantages will be more apparent from the accompanying drawings and the following detailed description.

BRIEF DESCRIPTION OF THE DRAWINGS

FIG. 11D is a block diagram illustrating a cell-type neuromorphic computerized system architecture useful with, inter cilia, an adaptive plasticity mechanism in a spiking network, in accordance with one or more implementations.

Figure 1:
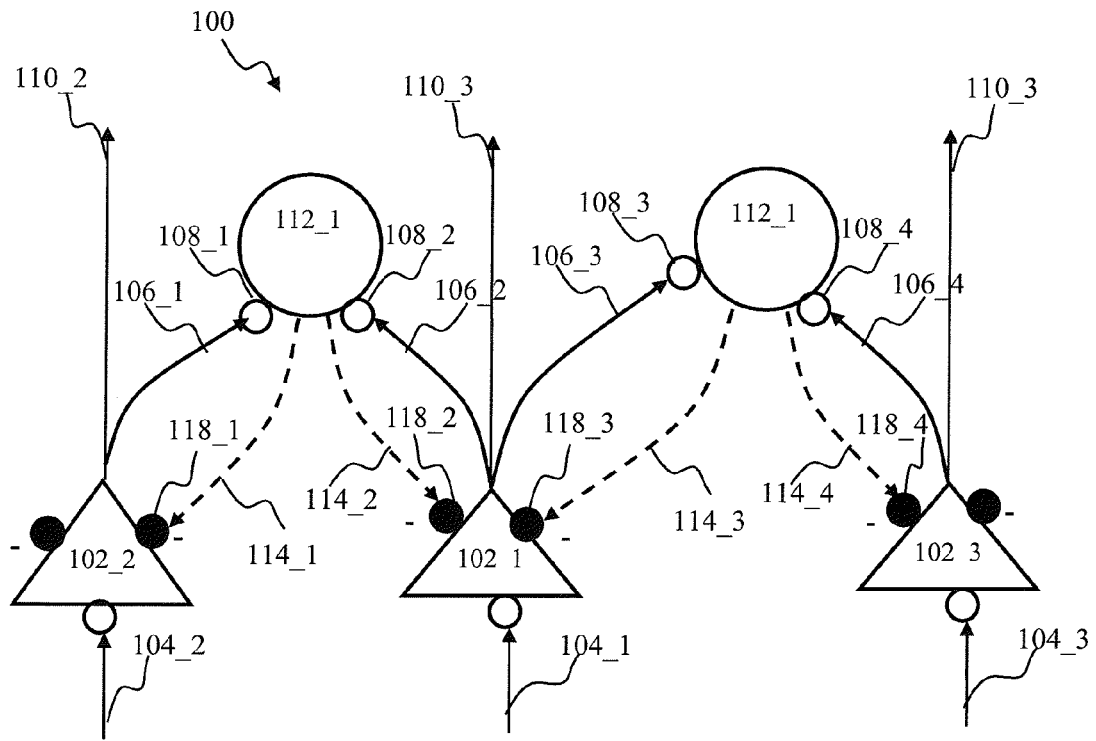
FIG. 1 is a graphical illustration depicting an artificial spiking neural network comprising excitatory and inhibitory neurons, according to one or more implementations.

All Figures disclosed herein are © Copyright 2012 Brain Corporation. All rights reserved.

DETAILED DESCRIPTION

Exemplary embodiments and implementations of the various aspects of the present innovation will now be described in detail with reference to the drawings, which are provided as illustrative examples so as to enable those skilled in the art to practice the disclosure. Notably, the figures and examples below are not meant to limit the scope of the present disclosure to a single embodiment or implementation, but other embodiments and implementations are possible by way of interchange of or combination with some or all of the described or illustrated elements. Wherever convenient, the same reference numbers will be used throughout the drawings to refer to same or like parts.

Where certain elements of these embodiments or implementations can be partially or fully implemented using known components, only those portions of such known components that are necessary for an understanding of the present disclosure will be described, and detailed descriptions of other portions of such known components will be omitted so as not to obscure the innovation.

In the present specification, an embodiment or implementations showing a singular component should not be considered limiting; rather, the invention is intended to encompass other embodiments or implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that is used to access the synaptic and neuron memory. The "bus" could be optical, wireless, infrared or another type of communication medium. The exact topology of the bus could be for example standard "bus", hierarchical bus, network-on-chip, address-event-representation (AER) connection, or other type of communication topology used for accessing, e.g., different memories in pulse-based system.

As used herein, the terms "computer", "computing device", and "computerized device", include, but are not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet or "phablet" computers, portable navigation aids, J2ME equipped devices, cellular telephones, smart phones, personal integrated communication or entertainment devices, or literally any other device capable of executing a set of instructions and processing an incoming data signal.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans), Binary Runtime Environment (e.g., BREW), and other languages.

As used herein, the terms "connection", "link", "synaptic channel", "transmission channel", "delay line", are meant generally to denote a causal link between any two or more entities (whether physical or logical/virtual), which enables information exchange between the entities.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms "processor", "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the term "network interface" refers to any signal, data, or software interface with a component, network or process including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 3G, LTE/LTE-A/TD-LTE, GSM, etc.) or IrDA families.

As used herein, the terms "pulse", "spike", "burst of spikes", and "pulse train" are meant generally to refer to, without limitation, any type of a pulsed signal, e.g., a rapid change in some characteristic of a signal, e.g., amplitude, intensity, phase or frequency, from a baseline value to a higher or lower value, followed by a rapid return to the baseline value and may refer to any of a single spike, a burst of spikes, an electronic pulse, a pulse in voltage, a pulse in electrical current, a software representation of a pulse and/or burst of pulses, a software message representing a discrete pulsed event, and any other pulse or pulse type associated with a discrete information transmission system or mechanism.

As used herein, the term "receptive field" is used to describe sets of weighted inputs from filtered input elements, where the weights may be adjusted.

As used herein, the term "Wi-Fi" refers to, without limitation, any of the variants of IEEE-Std. 802.11 or related standards including 802.11 a/b/g/n/s/v and 802.11-2012.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, RFID or NFC (e.g., EPC Global Gen. 2, ISO 14443, ISO 18000-3), satellite systems, millimeter wave or microwave systems, acoustic, and infrared (e.g., IrDA).

The present disclosure provides, in one salient aspect, apparatus and methods for implementing activity-based plasticity mechanisms in spiking neuron networks configured to, inter alia, to improve network response to input stimuli comprising a variety of features.

In some implementations, the input features may be unevenly distributed, so that some features may occur more frequently than others (e.g., a dark plane/bird statistically corresponding to a smaller area of the sky background). The activity-based plasticity mechanism of the disclosure is capable of reducing the response rate of neurons that develop receptive fields to more prevalent features. As a result, network output may become more evenly spread between different neurons responding to features of different frequency. Such functionality may advantageously provide network output such that rarely occurring features are not "drowned out" by more widespread stimulus.

In some implementations, the activity based plasticity may be implemented in a network comprising inhibitory neurons (e.g., artificial spiking neurons). Any given neuron of the network may provide an inhibitory signal to one or more neurons of the network via one or more outgoing inhibitory connections. An inhibitory connection is a connection that is characterized by an inhibitor efficacy (see e.g., inhibitory connections 114 of FIG. I) that e.g., suppress generation of some spikes within a burst of spikes. The neuron may receive inhibitory signals from the one or more neurons of the network via one or more incoming inhibitory connections. The neuron may generate a (post-synaptic) output. The activity based plasticity rule may comprise a pre-synaptic rule corresponding to the network input occurring prior the neuron generating the output. The activity-based plasticity rule may further comprise a post-synaptic rule corresponding to the neuron generating the output after the occurrence of the network input. Pre and/or post-synaptic rules may be used to, inter alia, modify the efficacy of inhibitory connections.

In one or more implementations, the pre-synaptic and the post-synaptic rules may be configured to cause anti-correlated (with one another) efficacy adjustment. In some implementations, the pre-synaptic rule may potentiate the connection, and/or the post-synaptic rule may depress the connection.

In some implementations, the activity based plasticity may be implemented in a heterogeneous network comprising one or more classes of different neuron types characterized by different response properties and different plasticity rules. In some implementations, the heterogeneous network may comprise excitatory and inhibitory units. The excitatory units may receive a feed-forward (FF) sensory input and an inhibitory input from the inhibitory neurons. The FF input may comprise visual, audio, and/or other input. The excitatory units may generate excitatory output. The excitatory units may provide their excitatory output as e.g., feed-forward excitatory input to the inhibitory units via excitatory connections.

The heterogeneous network may be configured to implement separate activity-based plasticity rules for excitatory and inhibitory connections. The inhibitory connection plasticity rule may comprise a pre-synaptic rule corresponding to the inhibitory unit input occurring after the output generation by excitatory neuron the. The inhibitory connection plasticity rule may further comprise a post-synaptic rule corresponding to the excitatory unit generating the output after the occurrence of the inhibitory input.

The excitatory connection plasticity rule may comprise a pre-synaptic rule corresponding to the excitatory input arriving after the inhibitory unit has generated output. The excitatory connection plasticity rule may further comprise a post-synaptic rule corresponding to the inhibitory unit generating the output after the occurrence of the excitatory input.

The activity-based plasticity methodology described herein may advantageously improve learning of the neural network. The improved learning may be characterized by e.g., emergence of different receptive fields, requiring fewer neurons to represent a given input, and/or ability of the network to recognize a richer feature set. When the input comprises unevenly distributed (in frequency) features, the improved learning may be further characterized emergence of receptive fields that may reflect feature occurrence. By way of non-limiting example, consider an input comprising predominantly vertical (or near vertical features), and rare horizontal (or near horizontal) features. Such input may correspond for instance to video footage of a winter landscape with predominantly vertical live trees and some fallen horizontal trees. The activity based plasticity adjustment may cause additional selectivity between neurons that develop receptive fields for vertical orientation. That is, as the vertical features are prevalent in the input, individual neurons may develop progressively more selective (e.g., narrower in angular dimension) receptive fields, wherein some neurons begin to respond to only vertical features within, for example ±2° from the vertical, and some neurons begin to respond to only slightly slanted features within, for example 2-5° from the vertical. Conversely, as the horizontal features occur less frequently, the neurons with horizontal sensitivity may respond to horizontal features within ±20° of the horizontal orientation.

Implementations of the foregoing functionality of the present disclosure are useful in a variety of applications, including for instance a prosthetic device, autonomous robotic apparatus, and other electromechanical devices requiring visual or other sensory data processing functionality.

Detailed descriptions of the various embodiments and implementations of the apparatus and methods of the disclosure are now provided. Although certain aspects of the disclosure can best be understood in the context of the sensory (e.g., visual) information processing using pulse-code neural networks, the disclosure is not so limited, and implementations of the disclosure may also be used in a wide variety of other applications, including for instance in implementing connection adaptation in pulse-code neural networks.

Implementations of the disclosure may be for example deployed in a hardware and/or software realization of a neuromorphic computer system. In one such implementation, a robotic system may include a processor embodied in an application specific integrated circuit, which can be adapted or configured for use in an embedded application (such as a prosthetic device).

FIG. 1 illustrates a spiking neuronal network 100, configured to process sensory stimulus, in accordance with one or more implementations. The sensory stimulus (the input 104 in FIG. 1) may comprise, for example, an audio signal, a stream of video frames, and/or other input. In some implementations, the input stimulus 104 may comprise image frames received from an image sensor (such as a CCD or a CMOS sensor device). In one or more implementations, the input may comprise a pixel stream downloaded from a file, such as a stream of two-dimensional matrices of red green blue RGB values (e.g., refreshed at a 24 Hz or other suitable frame rate). It will be appreciated by those skilled in the art when given this disclosure that the above-referenced image parameters are merely exemplary, and many other image representations (e.g., bitmap, luminance-chrominance (YUV, YCbCr), cyan-magenta-yellow and key (CMYK), grayscale, etc.) are equally applicable to and useful with the various aspects of the present disclosure. Furthermore, data frames corresponding to other (non-visual) signal modalities such as sonograms, IR, radar or tomography images are equally compatible with the processing network of FIG. 1, or yet other configurations.

The network 100 of FIG. 1 may comprise excitatory units (depicted by triangles 102 in FIG. 1) and inhibitory units 112 (depicted by white circles 112). The excitatory units 102 may receive the sensory input 104 as feed-forward stimulus. The excitatory units 102 may receive feedback inhibitory input via inhibitory connections (depicted by the broken lines 112 in FIG. 1) from the inhibitory neurons 112. The inhibitory connections 114 may be characterized by inhibitor efficacy, depicted by solid circles 118 in FIG. 1.

Individual excitatory neurons 102 may be operated in accordance with a neuron dynamic process that may be characterized by a neuronal state parameter. In some implementations, the state parameter may comprise neuron excitability, neuron membrane potential, and/or one or more other parameters. In some implementations, the dynamic process may comprise a stochastic process, such as for example described in co-owned U.S. patent application Ser. No. 13/487,533, entitled "SYSTEMS AND APPARATUS FOR IMPLEMENTING TASK-SPECIFIC LEARNING USING SPIKING NEURONS" filed Jun. 4, 2012 and issued as U.S. Patent No. 9,146,546 on Sep. 29, 2015, incorporated herein by reference in its entirety. In some implementations, connection efficacy may be used to describe a magnitude, and/or a probability of influence of pre-synaptic spike (e.g., the input 104 in FIG. 1) on response generation by a post-synaptic neuron (e.g., 102 in FIG. 1). In one or more implementations, connection efficacy may comprise for example a parameter such as synaptic weight, by which one or more state variables of the post-synaptic neuron(s) may be changed.

The excitatory neurons 102 may generate responses based on the sensory input 104 and the inhibitory input 114. In some implementations, the response may be generated in accordance with a deterministic spike response model, such as for example described in co-owned and co-pending U.S. patent application Serial No. 13/152,119 13/152,105, entitled "APPARATUS AND METHODS FOR TEMPORALLY PROXIMATE OBJECT RECOGNITION", filed on Jun 2, 2011, incorporated herein by reference in its entirety. In some implementations, the spike response process may comprise an adaptive threshold adjustment, such as e.g., described in co-owned U.S. patent application Ser. No. 13/623,820, entitled "APPARATUS AND METHODS FOR ENCODING OF SENSORY DATA USING ARTIFICIAL SPIKING NEURONS", filed on Sep 20, 2012, now U.S. Pat. No. 9,047,568, incorporated herein by reference in its entirety. In some implementations, the neuron may be operable in accordance with stochastic process, such as for example that described in co-owned and co-pending U.S. patent application Ser. No. 13/487,499, entitled "STOCHASTIC APPARATUS AND METHODS FOR IMPLEMENTING GENERALIZED LEARNING RULES", filed on Jun. 4, 2012, incorporated herein by reference in its entirety. Response generation in a stochastic neuron may be characterized by a probability of response generation.

The responses of the neurons 102 may be communicated via feed-forward connections 110, for subsequent processing by other parts of the network. In some implementations, such processing may comprise detection of higher-order features (e.g., corners), objects (e.g., rectangles), and/or other applications. Typically, the feed-forward stimulus 104 may cause an increase of a probability of the response by the neuron 102. Conversely, the feedback stimulus 114 may cause a decrease of the response probability. In some implementations, the probability decrease may be based on level of the inhibitory efficacy, e.g., element 118 in FIG. 1. The neurons 102 responses may be communicated to the neurons 112 as excitatory feed-forward stimulus via the excitatory connections 106.

In some implementations, corresponding to the inhibitory and/or excitatory units generating "bursts" of spikes, the inhibitory efficacy may suppress generation of some spikes within the burst. Such implementations may be referred to as the "soft" inhibition.

In some implementations, the inhibitory efficacy may be used to increment an inhibitory trace of a post-synaptic unit. The inhibitory trace may be configured e.g., in accordance with a "leaky" neuron process that may be configured to cause the inhibitory trace to decay with time in-between the increment events. In one or more implementations, the decay may be characterized by an exponentially decaying function of time, such as described in co-owned U.S. patent application Ser. No. 13/548,071, entitled "SPIKING NEURON NETWORK SENSORY PROCESSING APPARATUS AND METHODS", filed Jul. 12, 2012 and issued as U.S. Pat. No. 8,977,582on Mar. 10, 2015, incorporated herein by reference in its entirety. One or more inputs from the inhibitory units may cause the inhibitory trace to rise above an inhibition threshold; the inhibitory trace that is above the threshold may cause for example a "hard" inhibition preventing subsequent post-synaptic unit activity for a period of time.

In some implementations (not shown), the neuron units may comprise logic configured to implement inhibitory trace mechanism. In one such case, the inhibitory connections (e.g., the connections 114 of FIG. 1) may comprise parameters that are internal to the respective neuron (e.g., the neuron 102 in FIG. 1), thereby advantageously obviating the need for a separate inhibitory unit and/or inhibitory connection (and hence simplifying the network).

The inhibitory neurons 112 may generate responses based on the excitatory input 104. The responses of the neurons 112 may be communicated back to the neurons 102 via feed-back inhibitory connections, 114. The combination of neurons 102, 112, and the connections, 106, 114 may form a negative feedback loop.

Figure 2:
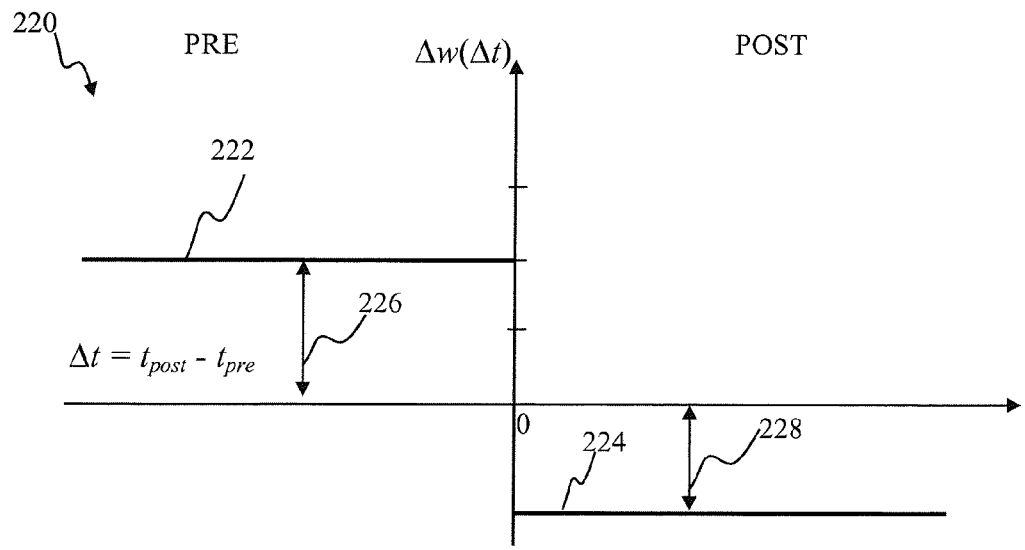
FIG. 2 is a plot depicting plasticity rule for use with the excitatory neurons of the network of FIG. 1, according to one or more implementations.

The excitatory connections 106 may be operable in accordance with activity-based plasticity rule, such as the exemplary rule 220 illustrated in FIG. 2. The plasticity rule 220 may be used to modify efficacy (denoted by the circle 108 in FIG. 1) of the connection 106. The plasticity rule 220 may comprise pre-synaptic portion 222 and post-synaptic portion 224, configured based on a time interval between time $t_{post}$ of the post-synaptic response (neuron output) and time $t_{pre}$ of the pre-synaptic input as: $\Delta t = t_{post} - t_{pre}$. It is noted that in FIG. 2, time is shown to increase from right to left, so that the area to the right of the y-axis (ordinate) corresponds to the past, relative the time of the post-synaptic response $t_{post}$. The pre-synaptic rule portion 222 may be invoked when the excitatory input (e.g., via the connection 106 in FIG. 1) arrives at the inhibitory unit (e.g., the neuron 112) after the unit 112 has generated post-synaptic response. The post-synaptic rule portion 224 may be invoked when the inhibitory neuron 112 may generate post-synaptic response after the occurrence of the excitatory input.

In one or more implementations, the pre-synaptic and the post-synaptic rules 222, 224 may be configured to effectuate opposing efficacy adjustments (e.g., as denoted by arrows 226, 228 in FIG. 2). For instance, the pre-synaptic rule 222 may cause efficacy increase (e.g., potentiate the connection 106) by amount 226, while the post-synaptic rule 224 may cause efficacy decrease (e.g., depress the connection 106) by amount 228. In some implementations, the depression magnitude 228 may be configured so as to be smaller than the potentiation (increase) magnitude 226. For instance, the depression magnitude 228 might comprise a 0.5 fraction (half) of the potentiation magnitude 226. It will be appreciated by those skilled in the arts that the exemplary excitatory connection plasticity rule shown in FIG. 2 is merely provided to illustrate the principles of the disclosure, and various other rules may readily be applied.

In some implementations, the excitatory connection 106 rule may be configured such that an integral of the pre-synaptic rule is positive while an integral of the post-synaptic rule is negative. Ratio of the magnitudes of the pre-synaptic rule and of the post-synaptic rule may be configured between 0.001 and 1.0.

Figure 3A:
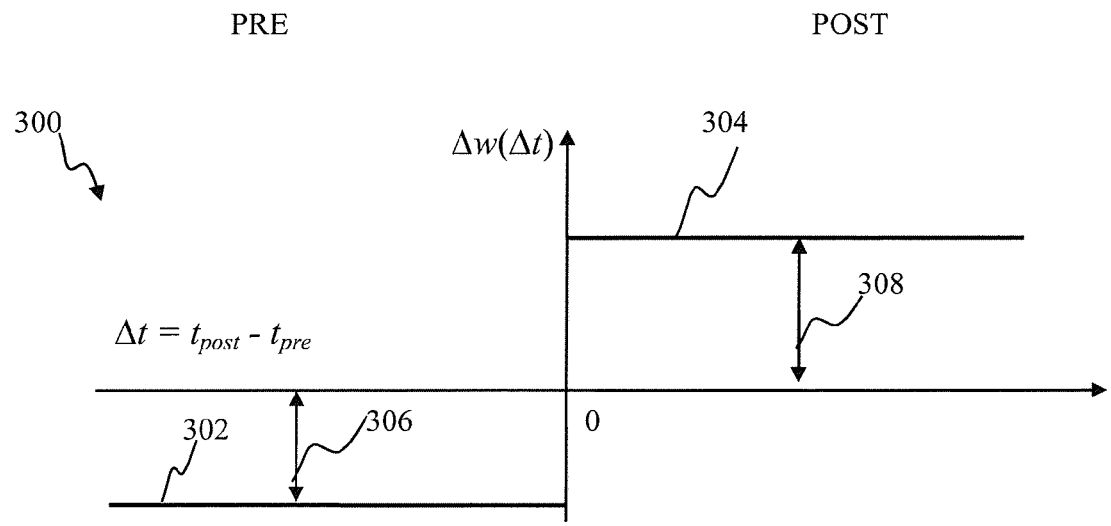
FIG. 3A is a plot depicting opposite plasticity rule for use with the inhibitory neurons of the network of FIG. 1, according to one or more implementations.
Figure 3B:
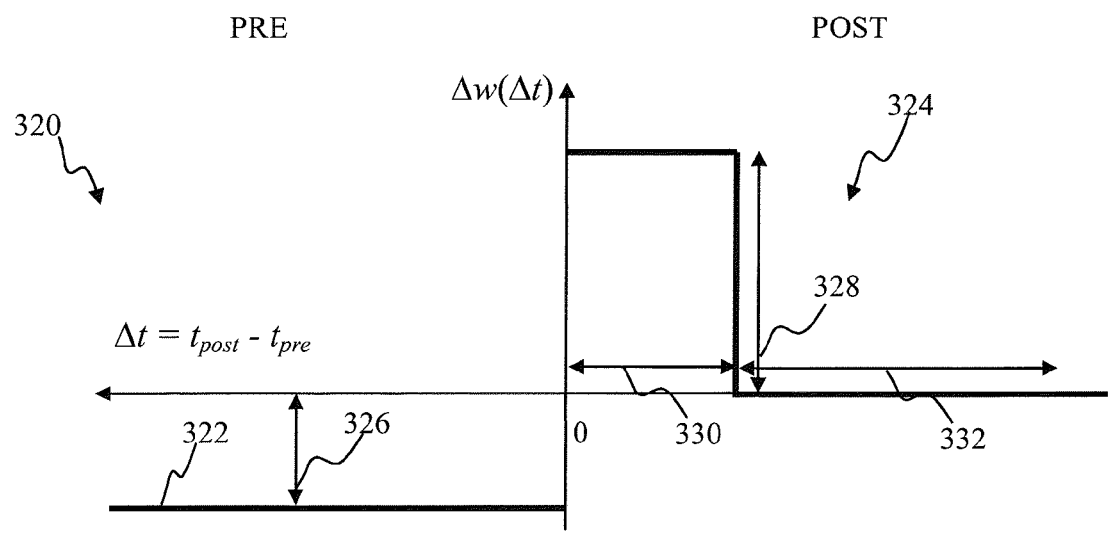
FIG. 3B is a plot depicting plasticity rule for use with the inhibitory neurons of the network of FIG. 1, according to one or more implementations.
Figure 3C:
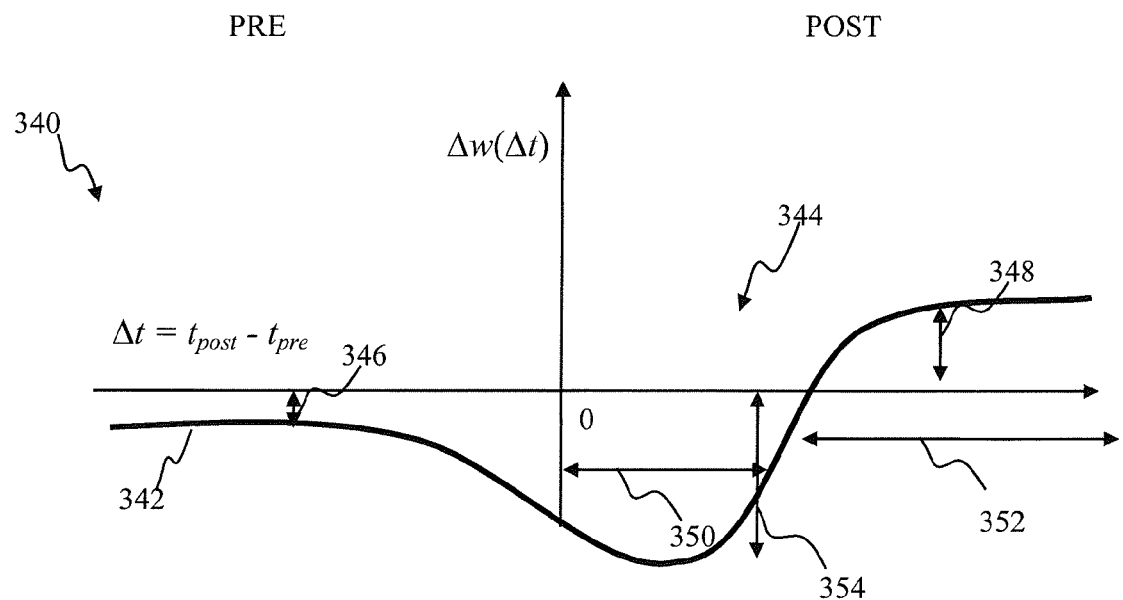
FIG. 3C is a plot depicting plasticity rule comprising composite post-synaptic portion, for use with the inhibitory neurons of the network of FIG. 1, according to one or more implementations.

The inhibitory connections 114 may further be operable in accordance with activity-based plasticity rule, such as for example the rules 300, 320, 340 illustrated in FIGS. 3A-3C, respectively. The plasticity rules of FIGS. 3A-3C may be used to modify efficacy (denoted by the solid circle 118 in FIG. 1) of the connection 114.

The plasticity rules 300, 320, 340 may comprise pre-synaptic portions 302, 322, 342, respectively, and post-synaptic portions 304, 324, 344, respectively, configured based on a time interval between time $t_{post}$ of the post-synaptic response (neuron output) and time $t_{pre}$ of the pre-synaptic input as: $\Delta t = t_{pre} - t_{post}$. It is noted that the time interval is shown in the Figures to increase from right to left, as indicated by the horizontal arrow in FIGS. 3A-3C. The pre-synaptic rule portion may be invoked when the inhibitory input arrives (e.g., via the connection 114 in FIG. 1) at the excitatory inhibitory unit (e.g., the neuron 102) after the unit 112 has generated a post-synaptic response. The post-synaptic rule portion may be invoked when the excitatory neuron 102 may generate a post-synaptic response after the occurrence of the inhibitory input (e.g., via the connection 114).

In one or more implementations, such as illustrated in FIG. 3A, the pre-synaptic and the post-synaptic rules 302, 304 may be configured to effectuate opposing efficacy adjustments (e.g., as denoted by arrows 306, 308 in FIG. 2) of the inhibitory connections (e.g., 114 in FIG. 1). For example, the pre-synaptic rule 302 may cause efficacy decrease (e.g., depress and/or weaken the connection 106) by amount 306, while the post-synaptic rule may cause efficacy increase (e.g., strengthen/potentiate the connection 114) by amount 308. In some implementations, the potentiation magnitude 308 may be configured to be greater than the depression magnitude 306. For example, the depression magnitude 306 may comprise a 0.01-0.5 fraction of the potentiation magnitude 308.

In one or more implementations, such as illustrated in FIG. 3B, the post-synaptic portion 324 of the plasticity rule 320 may comprise a potentiating region of width 330 and a region of width 332 where little (or no) efficacy modification is performed. When processing video input, comprising for example a 25 frames-per-second pixel stream, the width 330 of the potentiation region may be selected between 5 ms and 20 ms. As it will be appreciated by those skilled in the art, that sensory input of different temporal scales (e.g., ultrasonography imagery, and/or radar imagery for missile tracking) may be accompanied by plasticity rules, wherein the relevant scales are scaled in accordance with, for example, input stimulus refresh rate, or some other useful parameter or metric. In some implementations, the pre-synaptic rule portion 324 of the rule 320 may be characterized by depression magnitude 326 that may be configured to be e.g., comparable to the magnitude 306 of rule 300. In one or more implementations, the potentiation magnitude 328 of rule 320 may be configured greater than the potentiation magnitude 308 of rule 300 of FIG. 3A. In some implementations, an integral under the rule 324 may be configured equal (or on the order of) integral under the rule 304 of FIG. 3A.

FIG. 3C illustrates an exemplary plasticity rule 340 comprising a heterogeneous post-synaptic rule portion 344, in accordance with one or more implementations. The post-synaptic rule 344 may comprise a potentiation region 352 and depression region 350. When processing video input, comprising for example 25 frames-per-second pixel stream, the width 350 of the depression region may be selected between 5 ms and 20 ms. As it will be appreciated by those skilled in the art, sensory input of different temporal scales (e.g., ultrasonography imagery, and/or radar imagery for missile tracking) may be accompanied by plasticity rules where the relevant scales are scaled in accordance with, for example, input stimulus refresh rate. In some implementations.

Figure 4:
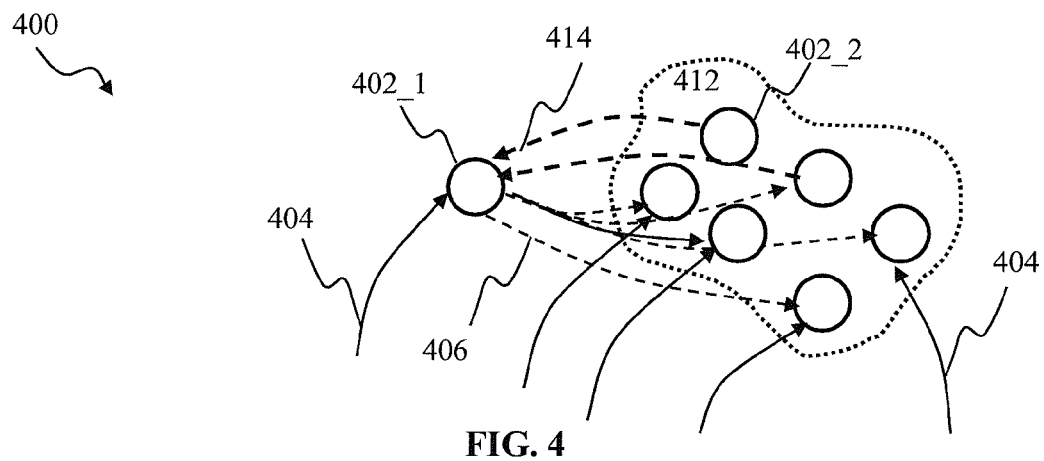
FIG. 4 is a graphical illustration depicting an artificial spiking neural network comprising inhibitory neurons, according to one or more implementations.

FIG. 4 illustrates a homogeneous sensory processing spiking neuron network 400, in accordance with one or more implementations. The network 400 may comprise a plurality of neurons 402 that may receive sensory input 404. Individual neurons (e.g., the neuron 402_1) may generate post-synaptic response(s) that may be communicated via one or more inhibitory connections 406 to one or more other neurons 402_2 of the network, depicted by the dotted curve 412 in FIG. 4. The neurons of the network portion 412 may generate post-synaptic responses based on the feed-forward sensory input 404 and the inhibitory input 406. The responses of the network portion 412 may be communicated to the neuron 402_1 via one or more inhibitory connections 414.

The inhibitory connections 406, 414 of the network 400 of FIG. 4 may be operable in accordance with one or more activity-dependent plasticity rules, such as the rules 300, 320, 340 described above with respect to FIGS. 3A-3C, respectively.

Figure 5A:
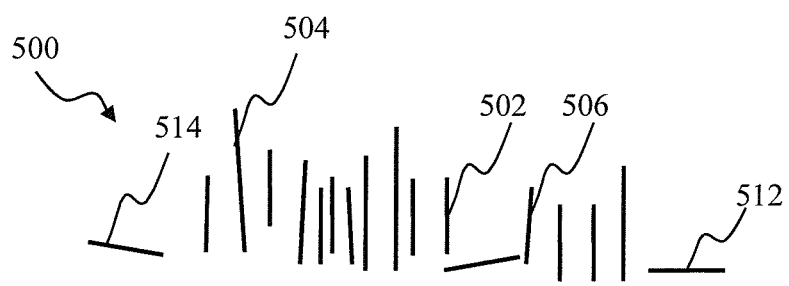
FIG. 5A is a graphical illustration depicting input stimulus comprising features of different occurrence frequency for use with the processing network of FIG. 1 and/or FIG. 4, according to one or more implementations.

In some implementations, the sensory input into network (e.g., the input 104 in FIG. 1, and/or the input 404 in FIG. 4) may comprise unevenly distributed (in frequency of occurrence) features, such as illustrated in FIG. 5A. According to one or more implementations, the input 500 of FIG. 5A may represent, for example, a photo and/or video footage of a winter landscape with predominantly vertical live trees 502, 504, 506 and fewer fallen horizontal trees 512, 514. In some prior art plasticity implementations, the input 500 may cause prior art network comprising, for example, 100 neurons to develop receptive field (RF) one configured to respond to vertical features 502, 504, 506; and another RF configured to respond to horizontal features 512, 514. By way of illustration, 60 neurons may develop vertical selectivity, 30 may develop horizontal selectivity while 10 may respond to other features, The network operated according to the prior art, the neuron selectivity may fall in the range between −45° to +45° s from the preferred orientation. Accordingly, when the input of FIG. 5A is provided to such network many more (30) vertical selectivity neurons will fire (due to a greater portion of near-vertical features) compared to the horizontal selectivity neurons.

Figure 5B:
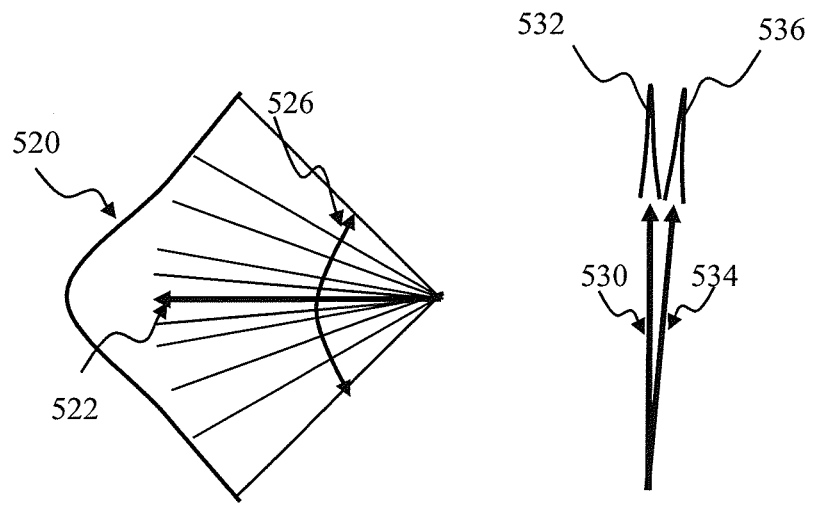
FIG. 5B is a graphical illustration depicting neuron receptive field configuration based on the stimulus of FIG. 5A, according to one or more implementations.

The activity-based plasticity adjustment mechanism of FIGS. 2-3C implemented by networks 100, 400 of FIGS. 1, 4 described above, may advantageously provide for further selectivity between neurons that develop receptive fields for vertically orientated features. FIG. 5B illustrates receptive field selectivity obtained using activity-dependent plasticity in accordance with one or more implementations. The curves 532,536 denote neuron receptive fields configured to respond to features with a center axis oriented along the arrows denoted 530, 532, respectively in FIG. 5B. The receptive field 532 may correspond to features in the input 500 that are oriented within ±3° from the vertical (e.g., feature 502 in FIG. 5A). The receptive field 536 may correspond to features in the input 500 that are oriented within ±3° from orientation of 5° off vertical (e.g., feature 506 in FIG. 5A). That is, different neurons may develop to respond to different 'vertical orientations' in the input 500 when the network is operated in accordance with the activity dependent plasticity.

The curve 520 denotes neuron receptive field configured to respond to features oriented within a sector of orientations denoted by the arrow 526 and centered at the orientation denoted by the horizontal arrow 522 in FIG. 5B. The receptive field 520 may correspond to features in the input 500 that are oriented within ±45° from the horizontal (e.g., features 512, 514 in FIG. 5A). That is, a single neuron may develop to respond to different 'horizontal orientations' in the input 500.

The selectivity mechanism of the disclosure may further be illustrated as follows. While the network of the prior art may respond more frequently to vertical features, as described above, the selectivity mechanism of the disclosure equalizes responses occurrence between horizontally and vertically selective neurons when processing, for example, the input of FIG. 5A. The equalization may be attained by, at least partly, increasing selectivity (e.g., reducing the RF angular extent) of the neurons responding to more frequent features (e.g., vertical in FIG. 5A) so that these vertical neurons may be tuned to, for example, ±15°.

Figure 5C:
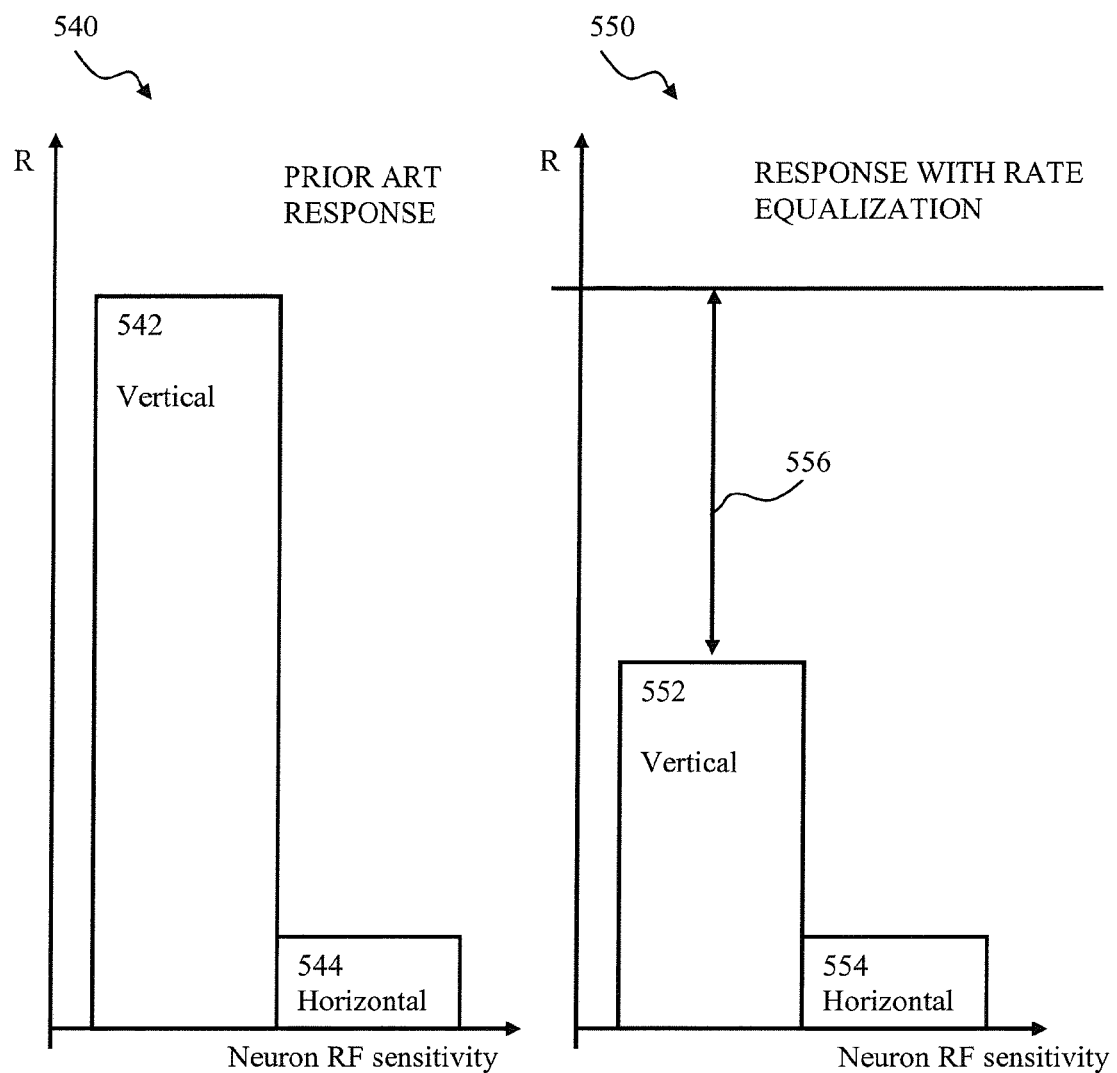
FIG. 5C is a plot illustrating rate equalization in a spiking neuron network configured to process stimulus of FIG. 5A, in accordance with one or more implementations.

FIG. 5C illustrates equalization of neuron responses to input stimulus comprising features of different occurrence frequency using the plasticity mechanism described above with respect to FIG. 1 and/or FIG. 4. Panel 540 in FIG. 5C illustrates responses of a neuron network of prior art, comprising neurons 542, 544 configured to respond to vertical and horizontal features, respectively. As the vertical features (e.g., the features 504, 504) are more prevalent (compared to the horizontal features) in the input 500 of FIG. 5A, the response rate of the neurons 542 is greater than the response rate of the 'horizontal' neurons 544, as depicted by the taller 'vertical' rectangle 542 compared to the shorter 'horizontal' rectangle 544 in FIG. 5C.

Panel 550 in FIG. 5C illustrates responses of a neuron network configured in accordance with the activity-based plasticity mechanism configured to implement rate equalization. The rectangles 552, 554 in panel 550 depict responses of neurons to vertical and horizontal features, respectively. The exemplary embodiment of the plasticity mechanism of the disclosure is capable of reducing response rate of the neurons that respond to more prevalent features (e.g., the response 552 to vertical features in FIG. 5C), as compared to the network of the prior art (e.g., the response 552). In some implementations, the rate reduction between the responses 542 and 552 may be for instance in the range from 2-5 times. At the same time, the response rate of the neurons that respond to less frequent features (e.g., the horizontal features in FIG. SC) may not be affected substantially. In some implementations, the response rate of less frequent features (e.g., 554) may be for instance in the range between 0.8 and 1.2 of the response rate of the prior art 544. As a result of the rate reduction of the vertically responding neurons, the network selectivity may be increased, as described in detail with respect to FIG. 5B, above.

Referring now to FIGS. 6A-9B, exemplary implementations of adaptive plasticity methods according to the disclosure are described. In some implementations, the methods of FIGS. 6A-9B may be used, for example, for operating connections 106, 114 of FIG. 1A and/or connections 416, 414 FIG. 4. The exemplary methods of FIGS. 6A-9B may be implemented by neurons (e.g., the neurons 102, and/or 112 of FIG. 1 and/or neurons 402 of FIG. 4). The methods of FIGS. 6A-9B may be implemented in sensory processing apparatus, comprising one or more spiking neuron networks as described with respect to FIG. 10, infra, thereby advantageously aiding, inter cilia improving learning, potentially reducing a number of spikes required to represent a given input, thereby enabling data compression.

Figure 6A:
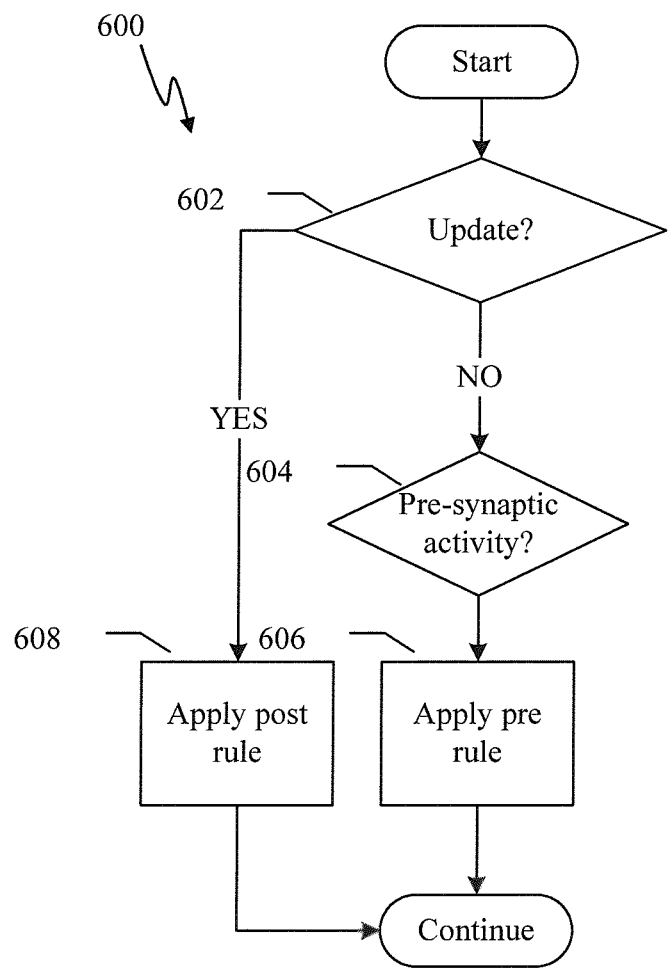
FIG. 6A is a logical flow diagram illustrating a generalized method of activity-dependent plasticity, in accordance with one or more implementations.

FIG. 6A illustrates an activity-dependent method of connection efficacy update, in accordance with one or more implementations. The method 600 of FIG. 6A may be utilized in, for example, a homogeneous network comprising inhibitory neurons (e.g., the network 400 of FIG. 4) for updating connections of a given neuron of the network (e.g., the neuron 402_1 of the network 400 of FIG. 4). The method 600 of FIG. 6A may be utilized in, for example, a heterogeneous network for updating connections of inhibitory units of the network (e.g., the units 112 of the network 100 of FIG. 1).

At step 602, a determination may be made whether the update is to be performed. In one or more implementations, the update may be based on a post-synaptic spike by the neuron. The update may be based for example on an external event (e.g., reinforcement signal); a timer event (e.g., for cyclic updates); or a buffer overflow event (e.g., indicative of a memory buffer, storing, for example, pre-synaptic and/or post-synaptic spike history) being full or nearly full. In some implementations, the history may comprise time data of pre-synaptic spikes stored in a synaptic memory buffer, such as described for example in U.S. patent application Ser. No. 13/239,259, entitled "APPARATUS AND METHOD FOR PARTIAL EVALUATION OF SYNAPTIC UPDATES BASED ON SYSTEM EVENTS", filed on Sep. 21, 2011, incorporated supra.

When the update is to be performed, the method may proceed to step 608, where a post-synaptic update may be performed. In one or more implementations, the post-synaptic update may comprise e.g., one or more post-synaptic rule portions 304, 324, 344 illustrated in FIGS. 3A-3C.

When the update of step 602 is not to be performed, the method may proceed to step 604, wherein a determination may be made as to whether pre-synaptic activity has occurred. In one or more implementations, the pre-synaptic activity may comprise input from an inhibitory unit, such as the input 114_1 from the unit 112_1 in FIG. 1.

When the pre-synaptic activity is present, the method may proceed to step 608, where pre-synaptic update may be performed. In one or more implementations, the pre-synaptic update may comprise e.g., one or more pre-synaptic rule portions 302, 322, 342 illustrated in FIGS. 3A-3C.

Figure 6B:
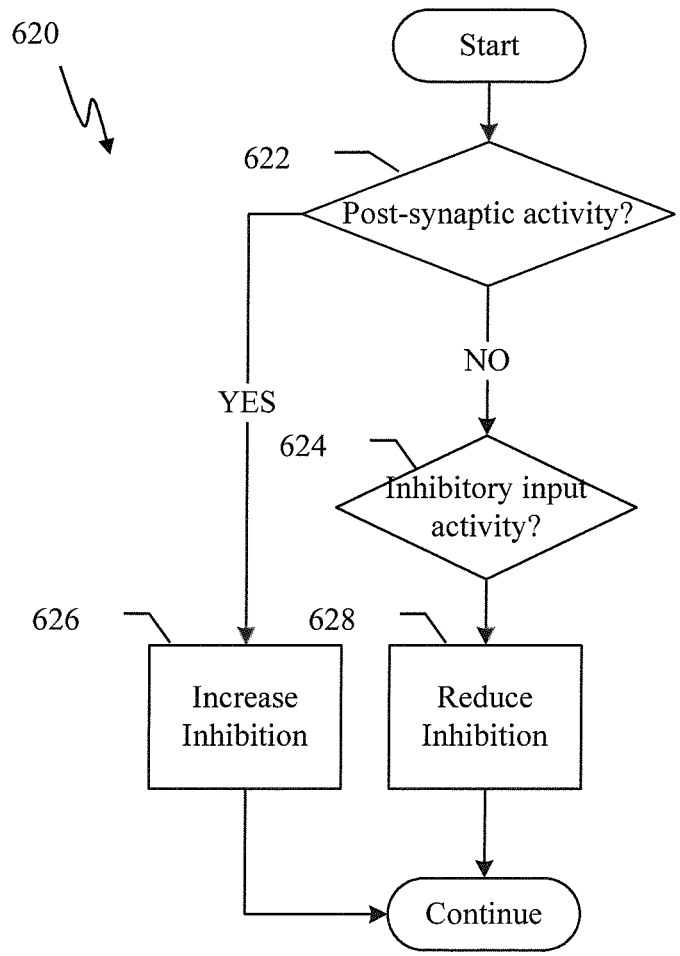
FIG. 6B is a logical flow diagram illustrating a method of inhibitory unit update for use with the network of FIG. 4, in accordance with one or more implementations.

FIG. 6B illustrates a method of connection update for use with inhibitory units of a network, in accordance with one or more implementations. The method 620 of FIG. 6B may be utilized in, for example, a homogeneous network comprising inhibitory neurons (e.g., the network 400 of FIG. 4). The method 620 of FIG. 6A may be utilized in, for example, a heterogeneous network for updating connections of the inhibitory units of the network (e.g., the units 112 of the network 100 of FIG. 1).

At step 622, a determination may be made whether the neuron response has been generated. In some implementations, the neuron and the network may correspond to the neuron 402_1 and the network portion 412 of FIG. 4. In some implementations, the neuron and the network may correspond to neurons 102 and 112 of FIG. 4, respectively.

When the post-synaptic response has been generated based, for example, on excitatory 404 and/or inhibitory input 414 in FIG. 4, a post synaptic plasticity rule may be evaluated at step 626. In one or more implementations, the post-synaptic rule may cause an increase of efficacy of connections providing inhibitory input into the post-synaptic neuron. In some implementations, the connections may correspond to connections 114 of FIG. 1 and/or connections 414 of FIG. 4. In one or more implementations, the post-synaptic Wile may be described by the curves 304, 324, 344 of FIGS. 3A-3C.

When the post-synaptic response has not been generated, the method may proceed to step 624 where a determination may be made as to whether pre-synaptic activity has occurred. In one or more implementations, the pre-synaptic activity may comprise input from an inhibitory unit, such as the input 114_1 from the unit 112_1 in FIG. 1.

When the inhibitory input activity is present (e.g., from another inhibitory unit), the method may proceed to step 628, where pre-synaptic update may be performed. In one or more implementations, the pre-synaptic rule may be configured to reduce inhibition onto the post-synaptic unit; e.g., the pre-synaptic rule may comprise reduction of inhibitory efficacy of the connection 114_1, and be described by the curves 302, 322, 342 of FIGS. 3A-3C.

Figure 7A:
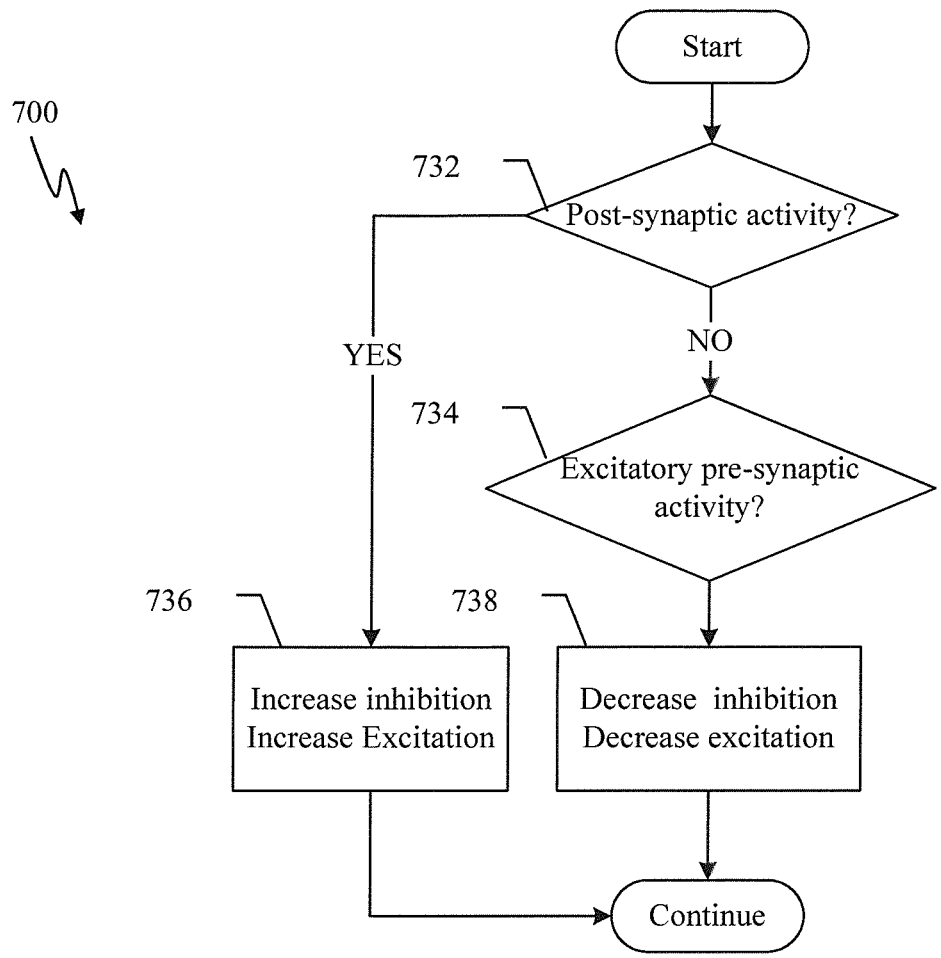
FIG. 7A is a logical flow diagram illustrating activity dependent plasticity for an inhibitory unit of the heterogeneous network of FIG. 1, in accordance with one or more implementations.
Figure 7B:
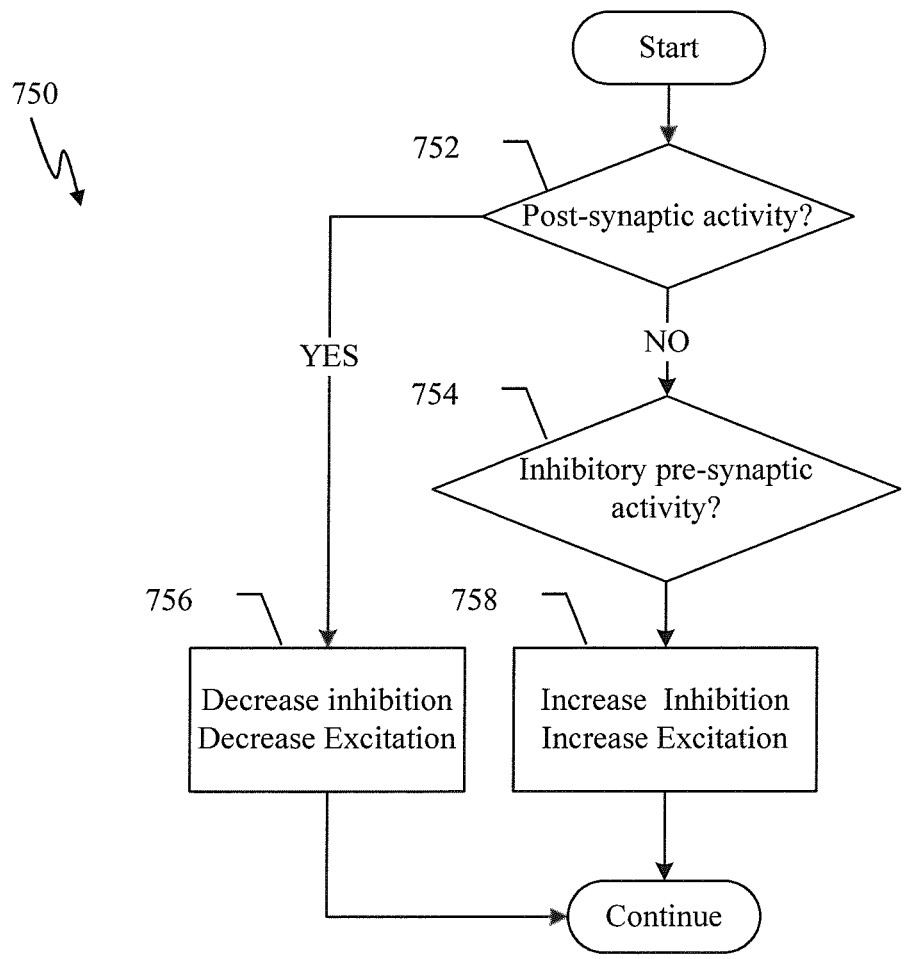
FIG. 7B is a logical flow diagram illustrating activity dependent plasticity for an excitatory unit of the heterogeneous network of FIG. 1, in accordance with one or more implementations.

FIGS. 7A-7B illustrate exemplary methods of implementing activity-dependent plasticity in a heterogeneous network, in accordance with one or more implementations. The approaches of methods 700, 730 may be utilized with the network 100 of FIG. 1, comprising excitatory (102) and inhibitory (112) portions.

FIG. 7A illustrates an exemplary plasticity update for an inhibitory neuron (e.g., the neuron 112_1 of FIG. 1), in accordance with one or more implementations. At step 732, a determination may be made whether the post-synaptic response has been generated by the inhibitory neuron.

When the post-synaptic response has been generated based, for example, on excitatory input 106_1 of FIG. 1, a post synaptic plasticity rule may be evaluated at step 736. In one or more implementations, the post-synaptic rule may cause (i) increase in efficacy of one or more connections providing inhibitory stimulus to excitatory neurons (e.g., the connection 114_1 in FIG. 1); and (ii) increase in efficacy of one or more connections providing excitatory stimulus input to the post-synaptic neuron (e.g., the connection 106_1 in FIG. 1). In some implementations, the inhibitory efficacy increase may comprise one or more rules 304, 324, 344 of FIGS. 3A-3C. In one or more implementations, the excitatory efficacy increase may comprise the rule 222 of FIG. 2.

When the post-synaptic response has not been generated, the method 700 may proceed to step 734, wherein a determination may be made as to whether pre-synaptic activity has occurred. In one or more implementations, the pre-synaptic activity may comprise an excitatory stimulus from an excitatory unit, such as the input 106_1 from the unit 102_1 in FIG. 1.

When the excitatory pre-synaptic activity is present, method 700 may proceed to step 738, where pre-synaptic update may be performed. In one or more implementations, the pre-synaptic update may be configured to cause: (i) a decrease of efficacy of one or more connections providing inhibitory stimulus to excitatory neurons (e.g., the connection 114_1 in FIG. 1); and (ii) decrease in efficacy of one or more connections providing excitatory stimulus input to the post-synaptic neuron (e.g., the connection 106_1 in FIG. 1). In some implementations, the inhibitory efficacy change may comprise one or more rules 302, 322, 342 of FIGS. 3A-3C. In one or more implementations, the excitatory efficacy change may comprise the rule 224 of FIG. 2.

FIG. 7B illustrates plasticity update for an excitatory neuron (e.g., the neuron 102_1 of FIG. 1), in accordance with one or more implementations. At step 752 of method 750, a determination may be made whether the post-synaptic response has been generated by the excitatory neuron.

When the post-synaptic response has been generated based, for example, on excitatory 104 and/or inhibitory input 114 of FIG. 1, a post synaptic plasticity rule may be evaluated at step 756. In one or more implementations, the post-synaptic rule may cause (i) a decrease of efficacy of one or more connections providing inhibitory input into the post-synaptic neuron (e.g., the connection 114_1 in FIG. 1); and (ii) a decrease in efficacy of one or more connections providing excitatory stimulus to inhibitory neurons (e.g., the connection 106_1 in FIG. 1). In some implementations, the inhibitory efficacy change may comprise one or more rules 302, 322, 342 of FIGS. 3A-3C. In one or more implementations, the excitatory efficacy decrease may comprise the rule 224 of FIG. 2.

When the post-synaptic response has not been generated by the excitatory neuron, method 750 may proceed to step 754, where a determination may be made as to whether pre-synaptic activity has occurred. In one or more implementations, the pre-synaptic activity may comprise input from an inhibitory unit, such as the input 114_1 from the unit 112_1 in FIG. 1.

When the inhibitory pre-synaptic activity is present (e.g., the inhibitory unit 112_1 has generated a response), the method 750 may proceed to step 758, where pre-synaptic update may be performed. In one or more implementations, the pre-synaptic update may be configured to cause: (i) an increase of efficacy of one or more connections providing inhibitory stimulus to the post-synaptic unit (e.g., the connection 114_1 in FIG. 1); and (ii) an increase in efficacy of one or more connections providing excitatory stimulus from the post-synaptic unit to inhibitory units (e.g., the connection 106_1 in FIG. 1). In some implementations, the inhibitory efficacy increase may comprise one or more rules 304, 324, 344 of FIGS. 3A-3C. In one or more implementations, the excitatory efficacy increase may comprise the rule 222 of FIG. 2.

Figure 8:
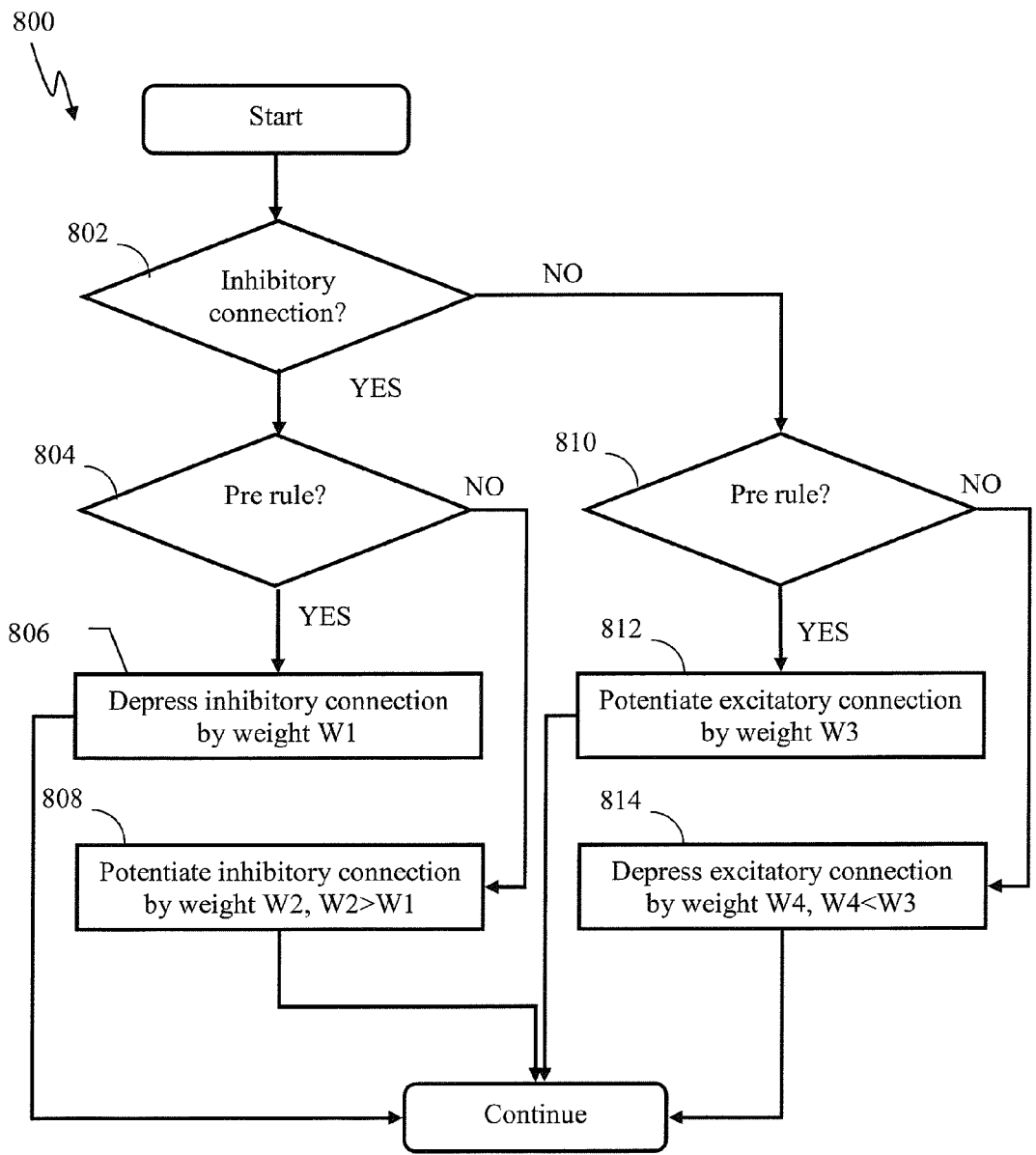
FIG. 8 is a logical flow diagram illustrating activity dependent plasticity rule for use with inhibitory and/or excitatory connections of the network of FIG. 1, in accordance with one or more implementations.

FIG. 8 illustrates method of operating connections of a heterogeneous network (comprising for example excitatory 106 and inhibitory 114 connections of FIG. 1), in accordance with one or more implementations.

At step 802 of method 800, a determination may be made as to whether an inhibitory connection is to be updated.

If the inhibitory connection is to be updated, the method may proceed to step 804, wherein a determination may be made if a pre-synaptic rule is to be applied. In some implementations, the determination of step 802 may be based on an evaluation of the time of the most-recent post-synaptic response ($t_{post}$) by excitatory neurons 102 and time ($t_{pre}$) of pre-synaptic input from inhibitory neurons 112 preceding $t_{post}$.

When it may be determined at step 804 that the pre-synaptic input from inhibitory neurons arrives after the excitatory neuron has generated a response ($t_{pre} > t_{post}$), the method may proceed to step 806.

At step 806, a pre-synaptic rule may be evaluated. In one or more implementations, the pre-synaptic rule may be configured to decrease efficacy of the inhibitory connection.

When it may be determined at step 804 that the excitatory neuron has generated a response subsequent to the occurrence of pre-synaptic input from inhibitory neuron(s) ($t_{pre} < t_{post}$), the method may proceed to step 808.

At step 808, a post-synaptic rule may be evaluated. In one or more implementations, the post-synaptic rule may be configured to increase efficacy of the inhibitory connection. In one or more implementations, the pre-synaptic and/or the post-synaptic rule of the adjustment of steps 806, 808 may comprise one or more plasticity rules 300, 320, 340 of FIGS. 3A-3C. In one or more implementations, the magnitude of the inhibitory efficacy potentiation of step 808 may be greater that the magnitude of the efficacy reduction of step 806.

When it is determined at step 802 that the excitatory connection is to be updated, the method may proceed to step 810, wherein a determination may be made as to whether a pre-synaptic rule is to be applied. In some implementations, the determination of step 802 may be based on an evaluation of the time of the most-recent post-synaptic response ($t_{post}$) by inhibitory neurons 102 and time ($t_{pre}$) of the pre-synaptic input from excitatory neurons 112 preceding $t_{post}$.

When it may be determined at step 810 that the pre-synaptic input from exitatory neurons arrives after the inhibitory neuron has generated a response ($t_{pre} > t_{post}$), the method may proceed to step 812.

At step 812, a pre-synaptic rule may be evaluated. In one or more implementations, the pre-synaptic rule may be configured to increase efficacy of the excitatory connection.

When it may be determined at step 810 that the inhibitory neuron has generated a response subsequent to the occurrence of pre-synaptic input from excitatory neuron(s) ($t_{pre} < t_{post}$), the method may proceed to step 814.

Figure 9A:
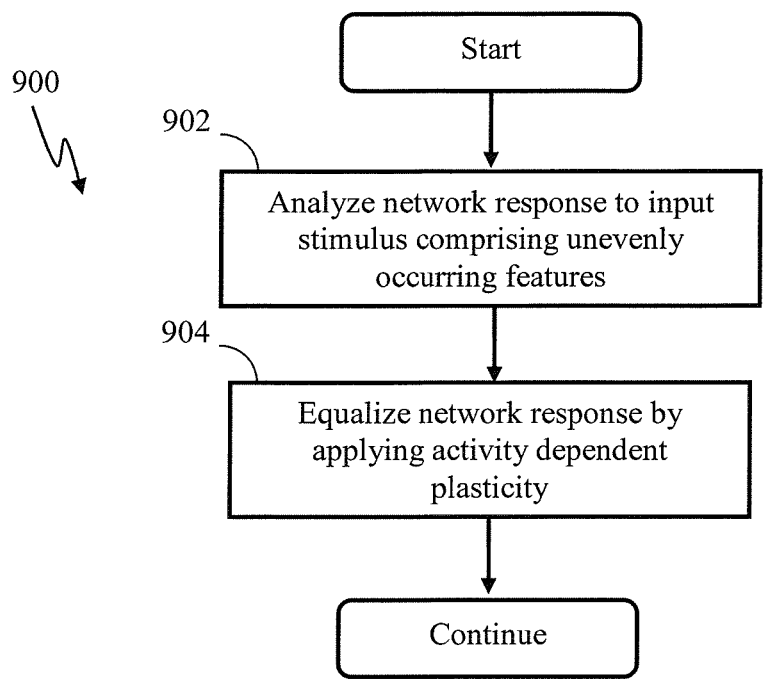
FIG. 9A is a logical flow diagram illustrating network response equalization via activity-dependent plasticity, in accordance with one or more implementations.

At step 814, a post-synaptic rule may be evaluated. In one or more implementations, the post-synaptic rule may be configured to decrease efficacy of the excitatory connection. In one or more implementations, the pre-synaptic and/or the post-synaptic rule of the adjustment of steps 806, 808 may comprise the plasticity rule 220 of FIGS. 2. In one or more implementations, the magnitude of the excitatory efficacy potentiation of step 812 may be greater that the magnitude of the efficacy reduction of step 814, FIG. 9A illustrates a method of equalizing rate of response by neurons of a spiking network via activity-dependent plasticity, in accordance with one or more implementations.

At step 902 of method 900, an analysis of network response to input stimulus may be performed. In one or more implementations, the input stimulus may comprise unevenly distributed (i.e., in frequency of occurrence) features, such as the input 500 of FIG. 5A. In some implementations, the analysis may comprise analysis of inhibitory neuron activity, such as the neurons 402 of the network 400 described above with respect to FIG. 4. In one or more implementations, the analysis may comprise analysis of activity of inhibitory and/or excitatory neurons, such as the neurons 112, 102, respectively, of the network 100 described above with respect to FIG. 1. In some implementations, the analysis may comprise analysis of activity of inhibitory and/or excitatory connections, such as the connections 112, 412 and 102 of FIGS. 1, 4. In some implementations, the response analysis may comprise an evaluation of the time of the most-recent post-synaptic response ($t_{post}$) by excitatory neurons 102 and time ($t_{post}$) of pre-synaptic input from inhibitory neurons 112 preceding $t_{post}$. In some implementations, the activity evaluation may comprise a comparison between the time of the most-recent post-synaptic response ($t_{post}$) by inhibitory neurons 112 and time ($t_{pre}$) of pre-synaptic input from excitatory neurons 102 preceding $t_{post}$.

At step 904, responses by individual neurons of the network may be equalized. In some implementations, activity of neurons responding to more frequently occurring features may be reduced using activity dependent plasticity. By a way of a non-limiting illustration, a neuron (e.g., the neuron 402_1 in FIG. 4) may respond with an output rate R1 to horizontal features 512 in FIG. 5A. One or more neurons (e.g., the neuron 402_2 in FIG. 4) may respond with an output rate R2 to vertical features 502 in FIG. 5A. When the neurons 402_1, 402_2 generate responses, efficacy of inhibitory connections 414, 406, respectively in FIG. 4, providing inhibitory input to 402_1, 402_2 gets increased. As the neuron 402_2 responds more frequently (due to a greater prevalence of vertical features in the input 500) the connection 406 becomes stronger compared to the connection 414 of the neuron 402_1. Therefore, the inhibitory input into the neuron 402_2 may exceed the inhibitory input into the neuron 402_1. When the inhibition into the 'vertical' neuron 402_2 becomes sufficiently strong (e.g., reaches inhibitory threshold, and/or reduces neuron excitability below firing threshold), the neuron 402_2 may not become inhibited and not respond to the input stimulus (e.g., the stimulus 404 in FIG. 4). Accordingly, the firing rate of the neuron 402_2 may become lower. In some implementations, the plasticity mechanism may cause reduction of the firing rate of the neuron 402_2 responding to vertical features, to the firing rate of the neuron 401_1 responding to horizontal features. In some implementations, the inhibition of the neuron 402_2 may enable other neurons of the partition 412 to begin responding to vertical features of slightly different orientation (e.g., the feature 506 oriented at 5°) compared to the feature 502 associated with the neuron 402_2 response. As a result, individual neurons of the partition 412 may develop further selectivity of their receptive fields to distinct vertical features, as illustrated by the receptive fields 532, 536 in FIG. 5B.

Figure 9B:
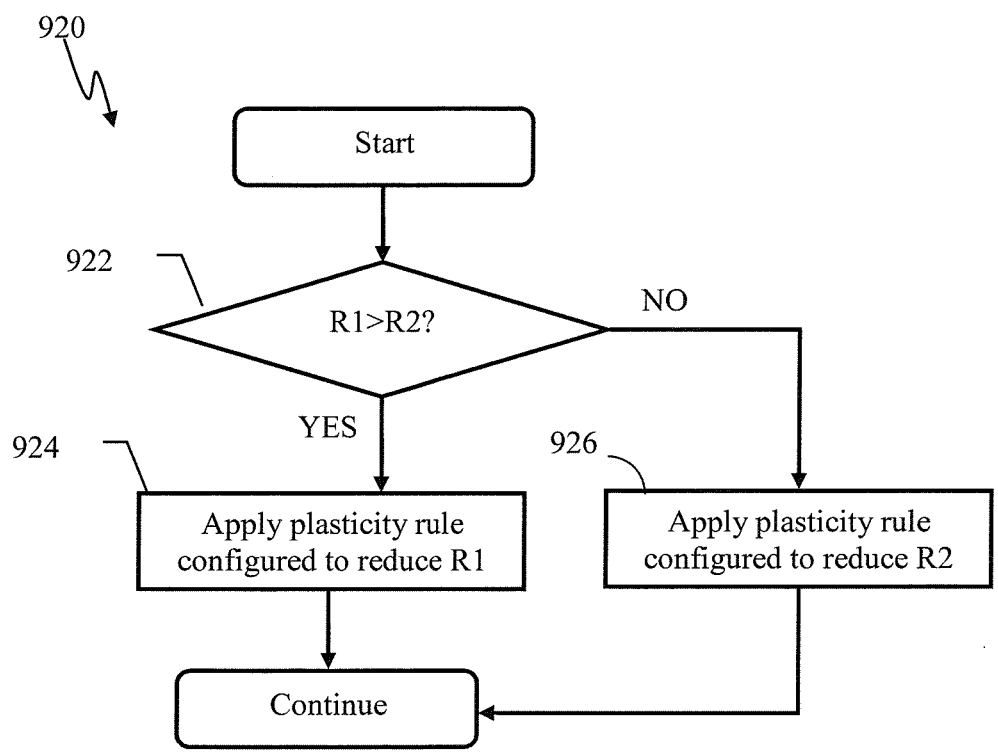
FIG. 9B is a logical flow diagram illustrating firing rate equalization via activity-dependent plasticity, in accordance with one or more implementations.

FIG. 9B illustrates a method of neuron firing rate equalization via activity-dependent plasticity, in accordance with one or more implementations. The method 920 of FIG. 9B may be utilized for instance in a network 400 comprising a plurality of inhibitory neurons and connections.

At step 922, the activity of a neuron may be compared to activity of one or more neuron of the network. In one or more implementations, the activity evaluation may comprise determination of post-synaptic responses by individual neurons.

When the neuron responds more frequently (e.g., characterized by higher firing rate), a plasticity mechanism that is configured to reduce neuron excitability may be applied at step 922. In some implementations, the plasticity mechanism may comprise potentiation of inhibitory connections into the neuron in accordance with, for example, rules 304, 324, 344 of FIGS. 3A-3C, respectively.

When the neuron responds less frequently (e.g., characterized by lower firing rate), a plasticity mechanism that is configured to increase neuron excitability may be applied at step 924. In some implementations, the plasticity mechanism may comprise depression of inhibitory connections into the neuron in accordance with, for example, rules 302, 322, 342 of FIGS. 3A-3C, respectively. In one or more implementations, increase in excitability may be achieved by reduction of inhibition.

Various exemplary spiking network apparatus implementing one or more of the methods set forth herein (e.g., using the exemplary activity dependent plasticity mechanisms described above) are now described with respect to FIGS. 10-11D.

Figure 10:
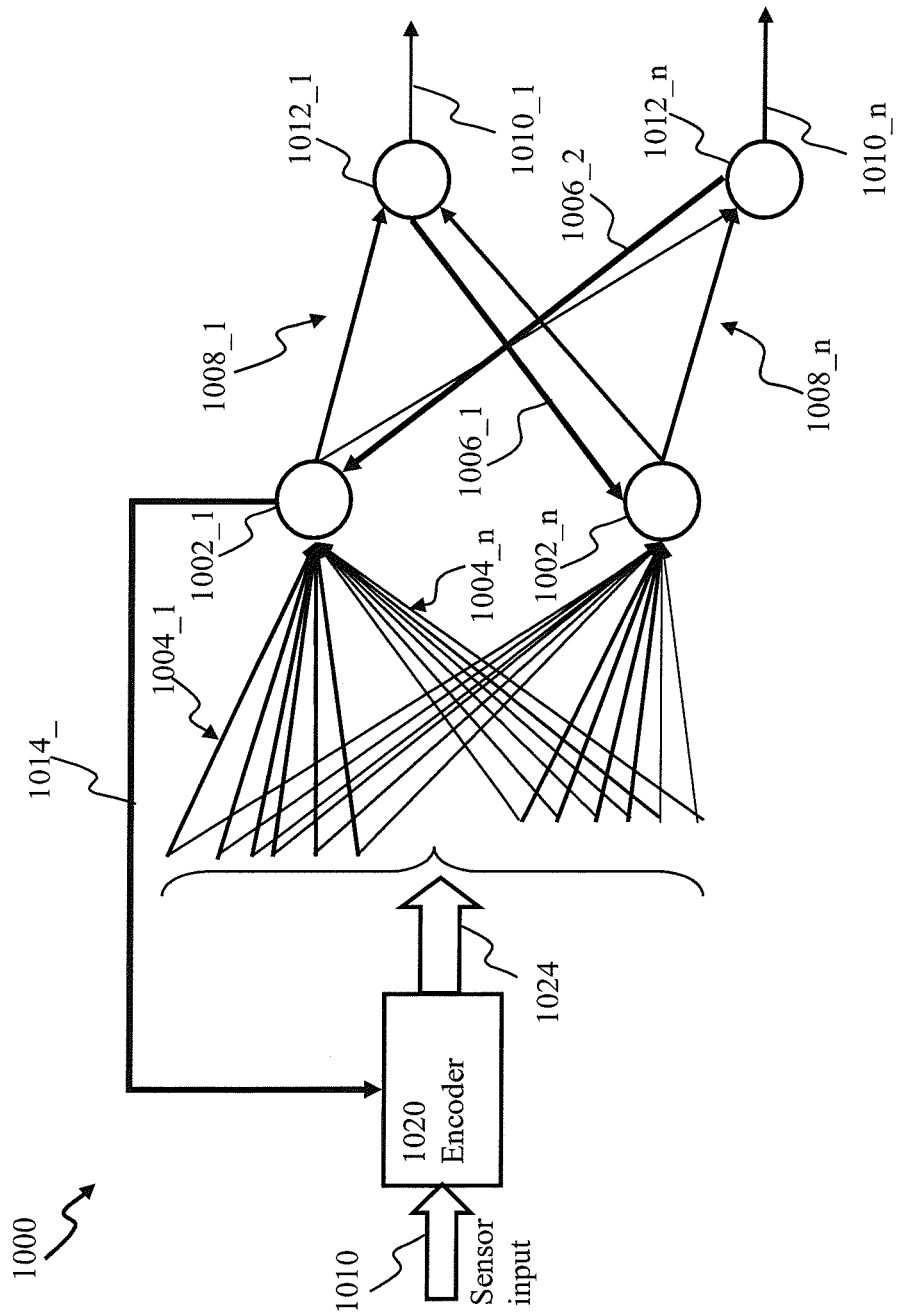
FIG. 10 is a block diagram illustrating a sensory processing apparatus comprising adaptive plasticity mechanism in accordance with one or more implementations.

One apparatus for processing of sensory information (e.g., visual, audio, somatosensory) using a spiking neural network (including one or more of the activity dependent plasticity mechanisms described herein) is shown in FIG. 10. The illustrated processing apparatus 1000 includes an input interface configured to receive an input sensory signal 1010. In some implementations, this sensory input comprises electromagnetic waves (e.g., visible light, IR, UV, and/or other wavelength) entering an imaging sensor array (comprising RGCs, a charge coupled device (CCD), CMOS device, or an active-pixel sensor (APS)). The input signal in this example is a sequence of images (image frames) received from a CCD or a CMOS camera via a receiver apparatus, or downloaded from a file. Alternatively, the image may be a two-dimensional matrix of RGB values refreshed at a 25 Hz frame rate. It will be appreciated by those skilled in the art that the above image parameters and components are merely exemplary, and many other image representations (e.g., bitmap, CMYK, grayscale, and/or another implementation) and/or frame rates are equally useful with the present disclosure.

The apparatus 1000 may comprise an encoder 1020 configured to transform (encode) the input signal so as to form an encoded signal 1024. In one variant, the encoded signal comprises a plurality of pulses (also referred to as a group of pulses) configured to model neuron behavior. The encoded signal 1026 may be communicated from the encoder 1024 via multiple connections (also referred to as transmission channels, communication channels, or synaptic connections) 1004 to one or more neuronal nodes (also referred to as the detectors) 1002.

In the implementation of FIG. 10, different detectors of the same hierarchical layer are denoted by an "_n" designator, such that e.g., the designator 1002_1 denotes the first detector of the layer 1002. Although only two detectors (1002_1, 1002_n) are shown in FIG. 10 for clarity, it is appreciated that the encoder can be coupled to any number of detector nodes that is compatible with the detection apparatus hardware and software limitations. Furthermore, a single detector node may be coupled to any practical number of encoders.

In one implementation, each of the detectors 1002_1, 1002_n contain logic (which may be implemented as a software code, hardware logic, or a combination of thereof) configured to recognize a predetermined pattern of pulses in the encoded signal 1004, using for example any of the mechanisms described in U.S. patent application Ser. No. 12/869,573, filed Aug. 26, 2010 and entitled "SYSTEMS AND METHODS FOR INVARIANT PULSE LATENCY CODING", U.S. patent application Ser. No. 12/869,583, filed Aug. 26, 2010 and entitled "INVARIANT PULSE LATENCY CODING SYSTEMS AND METHODS", U.S. patent application Ser. No. 13/117,048, filed May 26, 2011 and entitled "APPARATUS AND METHODS FOR POLYCHRONOUS ENCODING AND MULTIPLEXING IN NEURONAL PROSTHETIC DEVICES", U.S. patent application Ser. No. 13/152,084, filed Jun. 2, 2011, entitled "APPARATUS AND METHODS FOR PULSE-CODE INVARIANT OBJECT RECOGNITION", each incorporated herein by reference in its entirety, to produce post-synaptic detection signals transmitted over communication channels 1008. In FIG. 10, the designators 1008_1, 1008_n denote output of the detectors 1002_1, 1002_n, respectively.

In one implementation, the detection signals are delivered to a next layer of the detectors 1012 (comprising detectors 1012_1, 1012_m, 1012_k) for recognition of complex object features and objects, similar to the exemplary configuration described in commonly owned and co-pending U.S. patent application Ser. No. 13/152,084, filed Jun. 2, 2011, entitled "APPARATUS AND METHODS FOR PULSE-CODE INVARIANT OBJECT RECOGNITION", incorporated herein by reference in its entirety. In this configuration, each subsequent layer of detectors is configured to receive signals from the previous detector layer, and to detect more complex features and objects (as compared to the features detected by the preceding detector layer). For example, a bank of edge detectors is followed by a bank of bar detectors, followed by a bank of corner detectors and so on, thereby enabling alphabet recognition by the apparatus.

Each of the detectors 1002 may output detection (post-synaptic) signals on communication channels 1008_1, 1008_n (with appropriate latency) that may propagate with different conduction delays to the detectors 1012. The detector cascade of the apparatus of FIG. 10 may contain any practical number of detector nodes and detector banks determined, inter alia, by the software/hardware resources of the detection apparatus, and/or complexity of the objects being detected.

The sensory processing apparatus implementation illustrated in FIG. 10 may further comprise lateral connections 1006. In some variants, the connections 1006 are configured to communicate post-synaptic activity indications between neighboring neurons of the same hierarchy level, as illustrated by the connection 1006_1 in FIG. 10. In some variants, the neighboring neuron may comprise neurons having overlapping inputs (e.g., the inputs 1004_1, 1004_n in FIG. 10), so that the neurons may compete in order to not learn the same input features. In one or more implementations, the neighboring neurons may comprise spatially proximate neurons such as being disposed within a certain volume/area from one another on a 3-dimensional (3D) and or two-dimensional (2D) space.

The apparatus 1000 may also comprise feedback connections 1014, configured to communicate context information from detectors within one hierarchy layer to previous layers, as illustrated by the feedback connections 1014_1 in FIG. 10. In some implementations, the feedback connection 1014_2 is configured to provide feedback to the encoder 1024, thereby facilitating sensory input encoding, as described in detail in commonly owned and co-pending U.S. patent application Ser. No. 13/152,084, filed Jun. 2, 2011, entitled "APPARATUS AND METHODS FOR PULSE-CODE INVARIANT OBJECT RECOGNITION", incorporated supra.

Figure 11A:
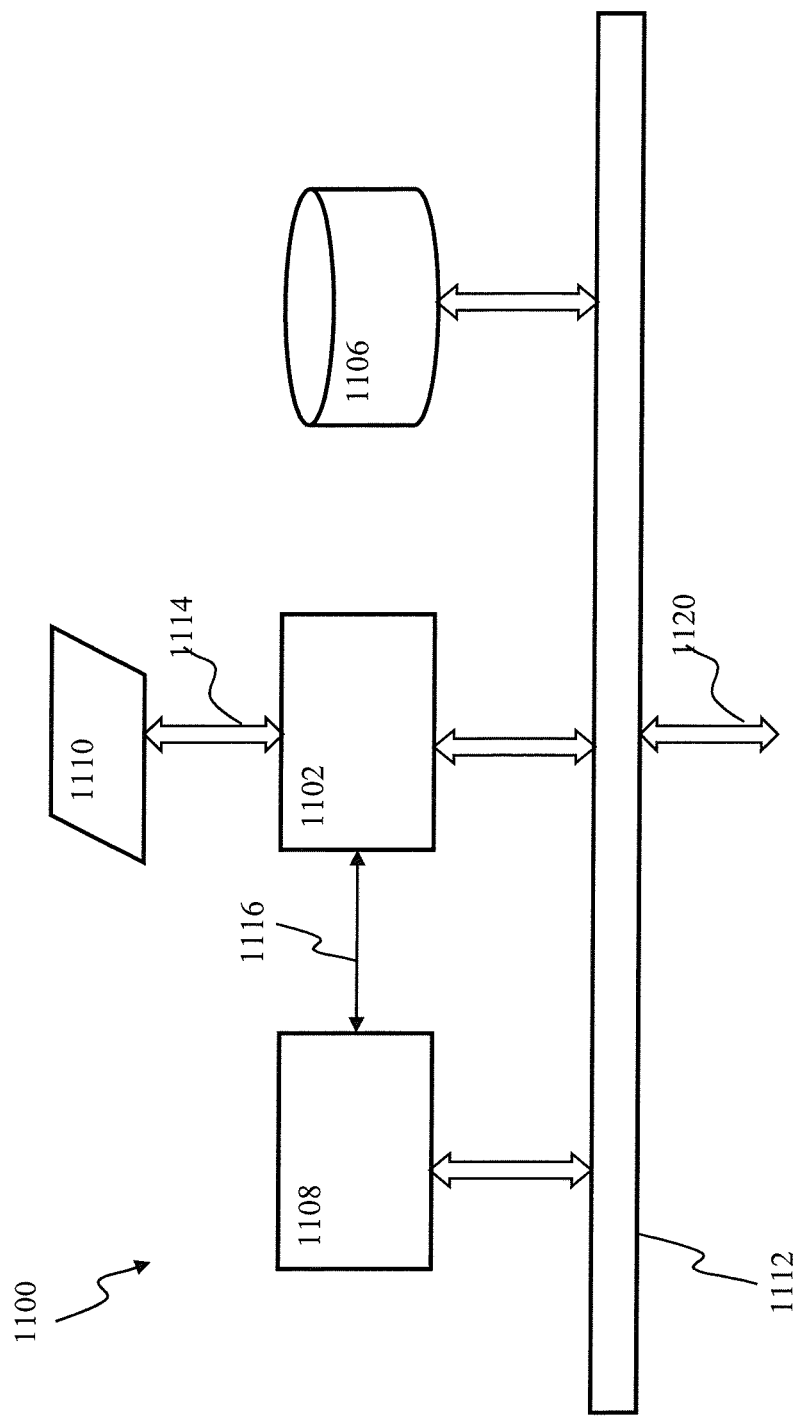
FIG. 11A is a block diagram illustrating a computerized system useful for, inter alia, providing an adaptive plasticity mechanism in a spiking network, in accordance with one or more implementations.

One particular implementation of the computerized neuromorphic processing system, adapted for operating a computerized spiking network (and implementing the exemplary plasticity methodology described supra), is illustrated in FIG. 11A. The computerized system 1100 of FIG. 11A comprises an input interface 1110, such as for example an image sensor, a computerized spiking retina, an audio array, a touch-sensitive input device, and/or another I0 device. The input interface 1110 is coupled to the processing block (e.g., a single or multi-processor block) via the input communication interface 1114. The system 1100 further comprises a random access memory (RAM) 1108, configured to store neuronal states and connection parameters (e.g., weights 108 in FIG. 1A), and to facilitate synaptic updates. In some exemplary implementations, synaptic updates are performed according to the description provided in, for example, in U.S. patent application Ser. No. 13/239,255 filed Sep. 21, 2011, entitled "APPARATUS AND METHODS FOR SYNAPTIC UPDATE IN A PULSE-CODED NETWORK", incorporated by reference supra.

In some implementations, the memory 1108 is coupled to the processor 1102 via a direct connection (memory bus) 1116. The memory 1108 may also be coupled to the processor 1102 via a high-speed processor bus 1112).

The system 1100 may further comprise a nonvolatile storage device 1106, comprising, inter alia, computer readable instructions configured to implement various aspects of spiking neuronal network operation (e.g., sensory input encoding, connection plasticity, operation model of neurons, and/or other processing functions). The nonvolatile storage 1106 may be used for instance to store state information of the neurons and connections when, for example, saving/loading network state snapshot, or implementing context switching (e.g., saving current network configuration (comprising, inter alia, connection weights and update rules, neuronal states and learning rules, and/or other parameters) for later use, and/or loading of a previously stored network configuration.

In some implementations, the computerized apparatus 1100 is coupled to one or more external processing/storage/input devices via an I/O interface 1120, such as a computer I/O bus (PCI-E), wired (e.g., Ethernet) or wireless (e.g., Wi-Fi) network connection.

In another variant, the input/output interface comprises a speech input (e.g., a microphone) and a speech recognition module configured to receive and recognize user commands.

It will be appreciated by those skilled in the arts that various processing devices may be used with computerized system 1100, including but not limited to, a single core/multicore CPU, DSP, FPGA, GPU, ASIC, combinations thereof, and/or other processors. Various user input/output interfaces are similarly applicable to implementations of the disclosure including, for example, an LCD/LED monitor, touch-screen input and display device, speech input device, stylus, light pen, trackball, end the likes.

Figure 11B:
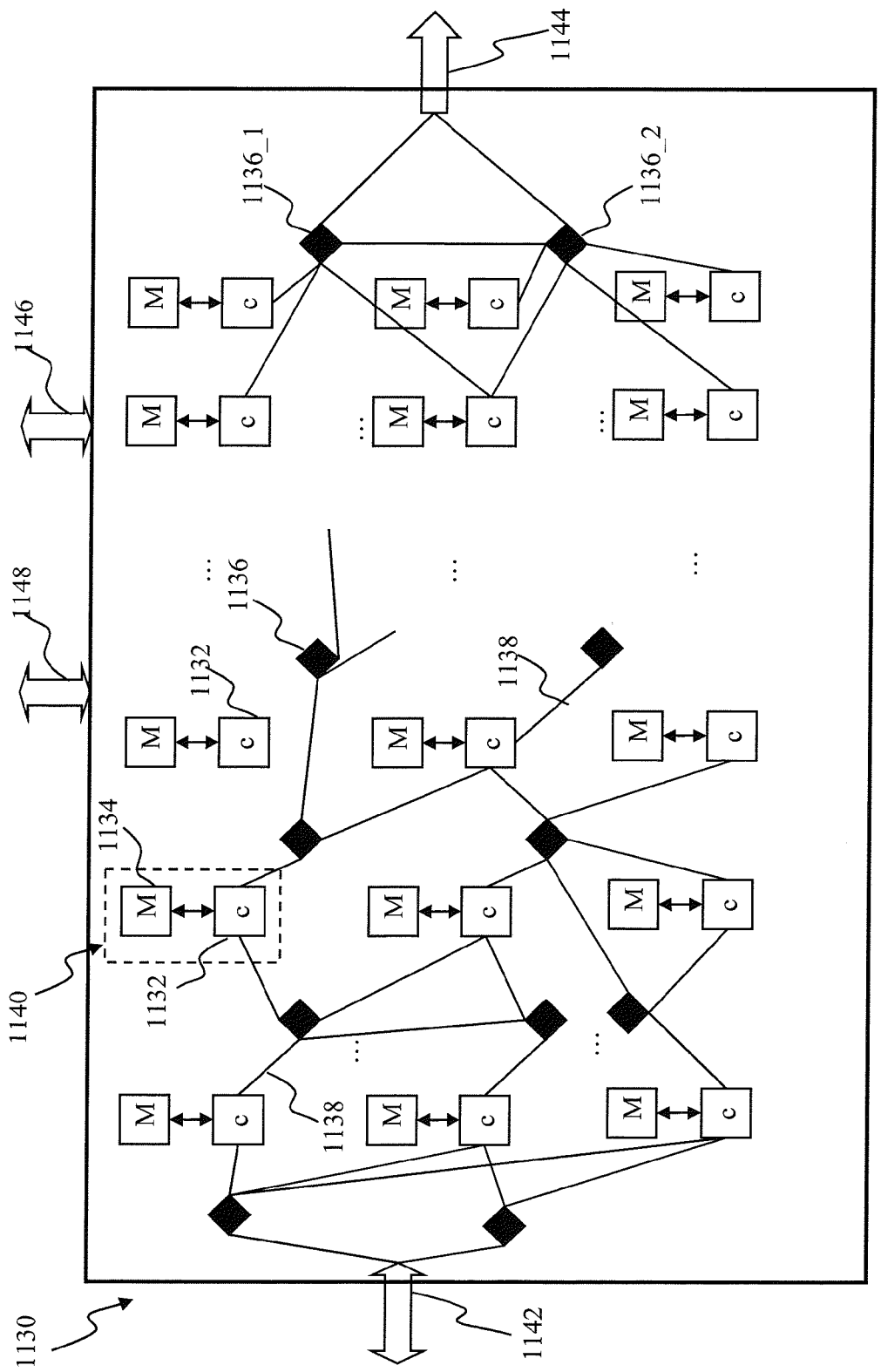
FIG. 11B is a block diagram illustrating a neuromorphic computerized system useful with, inter alia, an adaptive plasticity mechanism in a spiking network, in accordance with one or more implementations.

Referring now to FIG. 11B, one implementation of neuromorphic computerized system configured to implement modulated plasticity mechanism in a spiking network is described in detail. The neuromorphic processing system 1130 of FIG. 11B comprises a plurality of processing blocks (micro-blocks) 1140, where each micro-block comprises a computing logic core 1132 and a memory block 1134. The logic core 1132 is configured to implement various aspects of neuronal node operation, such as the node model, and synaptic update rules and/or other tasks relevant to network operation. The memory block is configured to store, inter alia, neuronal state variables and connection parameters (e.g., weights, delays, I/O mapping) of connections 1138.

The micro-blocks 1140 are interconnected with one another using connections 1138 and routers 1136. As it is appreciated by those skilled in the arts, the connection layout in FIG. 11B is exemplary, and many other connection implementations (e.g., one to all, all to all, and/or another mapping) are compatible with the disclosure.

The neuromorphic apparatus 1130 is configured to receive input (e.g., visual input) via the interface 1142. In one or more implementations, applicable for example to interfacing with a computerized spiking retina or an image array, the apparatus 1130 may provide feedback information via the interface 1142 to facilitate encoding of the input signal.

The neuromorphic apparatus 1130 is configured to provide output (e.g., an indication of recognized object or a feature, or a motor command, e.g., to zoom/pan the image array) via the interface 1144.

Figure 11C:
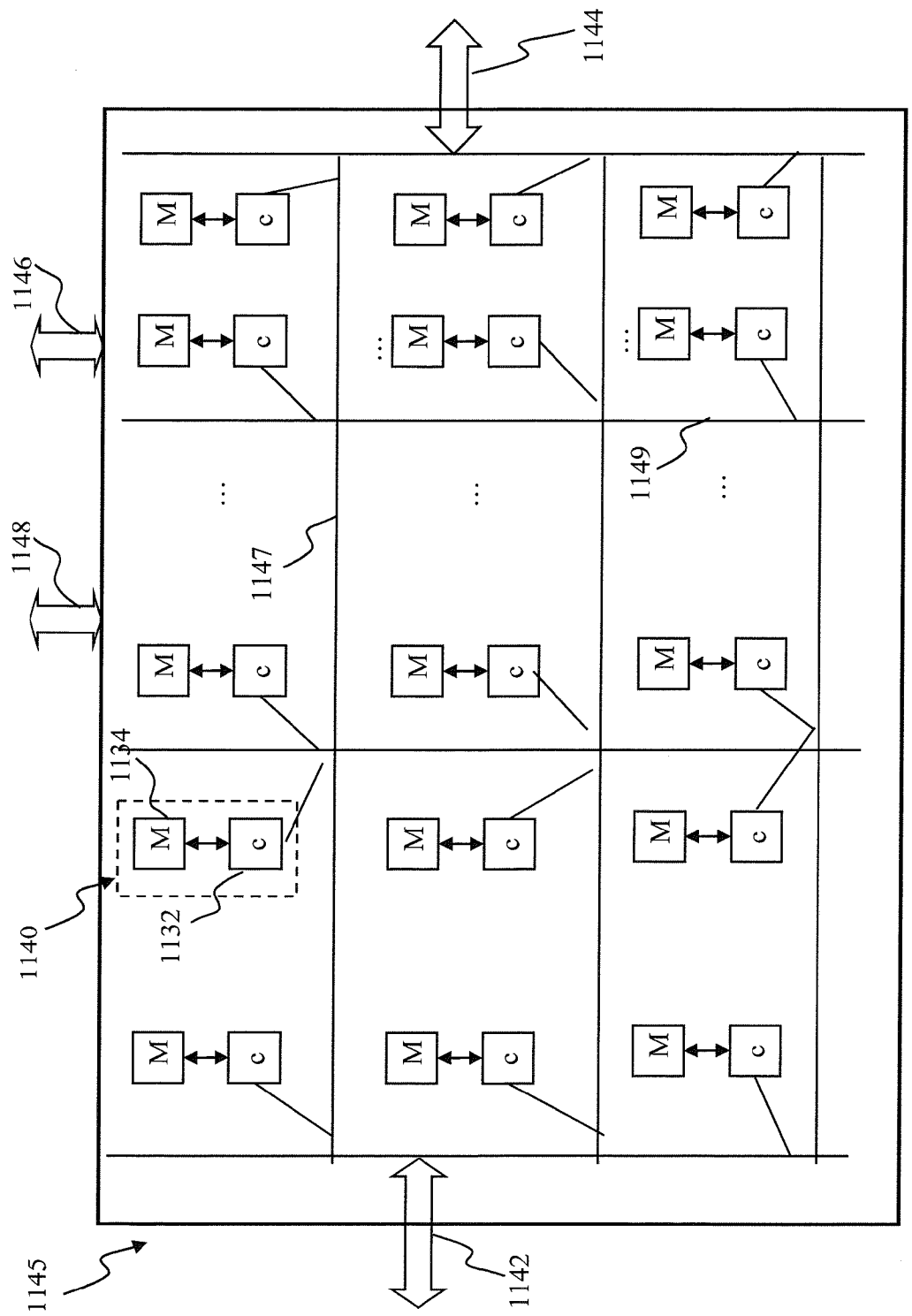
FIG. 11C is a block diagram illustrating a hierarchical neuromorphic computerized system architecture useful with, inter cilia, an adaptive plasticity mechanism in a spiking network, in accordance with one or more implementations.

The apparatus 1130, in one or more implementations, may interface to external fast response memory (e.g., RAM) via high bandwidth memory interface 1148, thereby enabling storage of intermediate network operational parameters (e.g., spike timing, and/or other parameters). The apparatus 1130 may also interface to external slower memory (e.g., Flash, or magnetic (hard drive)) via lower bandwidth memory interface 1146, in order to facilitate program loading, operational mode changes, and retargeting, where network node and connection information for a current task is saved for future use and flushed, and previously stored network configuration is loaded in its place, FIG. 11C illustrates one or more implementations of shared bus neuromorphic computerized system 1145 comprising micro-blocks 1140, described with respect to FIG. 11B, supra. The system 1145 of FIG. 11C may utilize shared bus 1147, 1149 to interconnect micro-blocks 1140 with one another.

FIG. 11D illustrates one implementation of cell-based neuromorphic computerized system architecture configured to implement activity based plasticity mechanism in a spiking network. The neuromorphic system 1150 of FIG. 11D comprises a hierarchy of processing blocks (cells block). In some implementations, the lowest level L1 cell 1152 of the apparatus 1150 may comprise logic and memory, and may be configured similar to the micro block 1140 of the apparatus shown in FIG. 11B. A number of cell blocks may be arranges in a cluster and communicate with one another a local interconnects 1162, 1164. Each such cluster may form a higher-level cell, e.g., cell L2, denoted as 1154 in FIG. 11D. Similarly, several L2 clusters may communicate with one another via a second-level interconnect 1166 and form a super-cluster L3, denoted as 1156 in FIG. 11D. The super-clusters 1154 may for example communicate via a third level interconnect 1168, and may form a next level cluster, and so on. It will be appreciated by those skilled in the arts that the hierarchical structure of the apparatus 1150, comprising a given number (e.g., four) cells per level, is merely one exemplary implementation, and other implementations may comprise more or fewer cells per level, and/or fewer or more levels, as well as yet other types of architectures.

Different cell levels (e.g., L1, L2, L3) of the exemplary apparatus 1150 of FIG. 11D may be configured to perform functionality with various levels of complexity. In one implementation, different L1 cells may process in parallel different portions of the visual input (e.g., encode different frame macro-blocks), with the L2, L3 cells performing progressively higher-level functionality (e.g., edge detection, object detection). Different L2, L3 cells may also perform different aspects of operating for example a robot, with one or more L2/L3 cells processing visual data from a camera, and other L2/L3 cells operating a motor control block for implementing lens motion when e.g., tracking an object, or performing lens stabilization functions.

The neuromorphic apparatus 1150 may receive input (e.g., visual input) via the interface 1160. In one or more implementations, applicable for example to interfacing with a computerized spiking retina or image array, the apparatus 1150 may provide feedback information via the interface 1160 to facilitate encoding of the input signal.

The neuromorphic apparatus 1150 may provide output (e.g., an indication of recognized object or a feature, or a motor command, e.g., to zoom/pan the image array) via the interface 1170. In some implementations, the apparatus 1150 may perform all of the I/O functionality using single I/O block (not shown).

The apparatus 1150, in one or more implementations, may also interface to external fast response memory (e.g., RAM) via high bandwidth memory interface (not shown), thereby enabling storage of intermediate network operational parameters (e.g., spike timing, and/or other parameters). The apparatus 1150 may also interface to external slower memory (e.g., flash, or magnetic (hard drive)) via lower bandwidth memory interface (not shown), in order to facilitate program loading, operational mode changes, and retargeting, where network node and connection information for a current task is saved for future use and flushed, and a previously stored network configuration is loaded in its place.

In one or more implementations, networks of the apparatus 1130, 1145, 1150 may be implemented using the Elementary Network Description (END) language, described for example in U.S. patent application Ser. No. 13/239,123, entitled "ELEMENTARY NETWORK DESCRIPTION FOR NEUROMORPHIC SYSTEMS WITH PLURALITY OF DOUBLETS WHEREIN DOUBLET EVENTS RULES ARE EXECUTED IN PARALLEL", filed Sep. 21, 2011 and issued as U.S. Pat. No. 9,104,973 in Aug. 11, 2015, and/or the High Level Neuromorphic Description (HLND) framework, described for example in U.S. patent application Ser. No. 13/385,938, entitled "TAG-BASED APPARATUS AND METHODS FOR NEURAL NETWORKS", filed Mar. 15, 2012 and issued as U.S. Pat. No. 8,712,939 on Apr. 29, 2014, each of the foregoing being incorporated herein by reference in its entirety. In one or more implementations, the HLND framework may be augmented to handle event based update methodology described, for example, in co-pending U.S. patent application Ser. No. 13/588,774, entitled "APPARATUS AND METHODS FOR IMPLEMENTING EVENT-BASED UPDATES IN SPIKING NEURON NETWORKS", filed Aug. 17, 2012, the foregoing being incorporated herein by reference in its entirety. In some implementations, the networks may be updated using an efficient network update methodology, described, for example, in co-pending U.S. patent application Ser. No. 13/560.891, entitled "APPARATUS AND METHODS FOR EFFICIENT UPDATES IN SPIKING NEURON NETWORK NETWORKS", filed Jul. 27, 2012, the foregoing being incorporated herein by reference in its entirety.

The plasticity mechanism described herein may advantageously improve the quality of the feature learning (as may be characterized by a number of false positives, and/or a number of identifiable features), and/or to increase neuron receptive selectivity.

Various aspects of the disclosure may advantageously be applied to, inter alia, the design and operation of large spiking neural networks configured to process streams of input stimuli, in order to aid in detection and functional binding related aspect of the input.

In some implementations, activity-based and/or plasticity modulation mechanisms described herein may be implemented in a spiking neuron of a network, or in a connection of the network.

It is appreciated by those skilled in the arts that above implementation are exemplary, and the framework of the disclosure is equally compatible and applicable to processing of other information, such as, for example information classification using a database, where the detection of a particular pattern can be identified as a discrete signal similar to a spike, and where coincident detection of other patterns influences detection of a particular one pattern based on a history of previous detections in a way similar to an operation of exemplary spiking neural network.

Advantageously, exemplary implementations of the various aspects of the present innovation are useful in a variety of devices including without limitation prosthetic devices, autonomous and robotic apparatus, and other electromechanical devices requiring sensory processing functionality. Examples of such robotic devises are manufacturing robots (e.g., automotive), military, medical (e.g. processing of microscopy, x-ray, ultrasonography, tomography). Examples of autonomous vehicles include rovers, unmanned air vehicles, underwater vehicles, smart appliances (e.g. ROOMBA®), Lego® robotic toys, and/or other devices.

Implementations of the principles of the disclosure are applicable to video data compression and processing in a wide variety of stationary and portable devices, such as, for example, smart phones, portable communication devices, notebook, netbook and tablet computers, surveillance camera systems, and practically any other computerized device configured to process vision data.

Implementations of the principles of the disclosure are further applicable to a wide assortment of applications including computer human interaction (e.g., recognition of gestures, voice, posture, face, and/or other aspects), controlling processes (e.g., an industrial robot, autonomous and other vehicles), augmented reality applications, organization of information (e.g., for indexing databases of images and image sequences), access control (e.g., opening a door based on a gesture, opening an access way based on detection of an authorized person), detecting events (e.g., for visual surveillance or people or animal counting, tracking), data input, financial transactions (payment processing based on recognition of a person or a special payment symbol) and many others.

Advantageously, the disclosure can be used to simplify tasks related to motion estimation, such as where an image sequence is processed to produce an estimate of the object position (and hence velocity) either at each points in the image or in the 3D scene, or even of the camera that produces the images. Examples of such tasks are: ego motion, i.e., determining the three-dimensional rigid motion (rotation and translation) of the camera from an image sequence produced by the camera; following the movements of a set of interest points or objects (e.g., vehicles or humans) in the image sequence and with respect to the image plane.

In another approach, portions of the object recognition system are embodied in a remote server, comprising a computer readable apparatus storing computer executable instructions configured to perform pattern recognition in data streams for various applications, such as scientific, geophysical exploration, surveillance, navigation, data mining (e.g., content-based image retrieval). A myriad of other applications exist that will be recognized by those of ordinary skill given the present disclosure.

What is claimed:

1. A method of adjusting connection efficacy in a neuron network, comprising:
   based on generating an excitatory output by a neuron, (i) increasing a first efficacy of one or more inhibitory connections providing an inhibitory input to the neuron and (ii) increasing a second efficacy of one or more excitatory connections providing an excitatory output to an inhibitory neuron; and based on receiving the inhibitory input, reducing the first efficacy and reducing the second efficacy.

2. The method of 1, wherein:
the excitatory output and the inhibitory input comprise an excitatory output rate and an inhibitory input rate, respectively; and
a parameter comprises a ratio of the excitatory output rate to the inhibitory input rate.

3. The method of 1, where the neuron network further comprises an inhibitory network comprising one or more inhibitory neurons.

4. The method of 1, wherein:
the excitatory output is based on at least a portion of a feed-forward input signal; and
the excitatory output increases a probability of a response being generated by the inhibitory neuron.

5. The method of 1, wherein:
the inhibitory input is based at least in part on the excitatory output by the neuron; and
the inhibitory input reduces a probability of a response being generated by the neuron.

6. A neural network system, comprising:
a neuron configured to generate an excitatory output;
one or more inhibitory neurons configured to provide an inhibitory input, the one or more inhibitory neurons operatively coupled to the neuron via one or more inhibitory connections; and
a processor comprising a plurality of instructions configured to, when executed, cause the processor to:
based on the generation of the excitatory output by the neuron, increase an efficacy of the one or more inhibitory connections, the one or more inhibitory connections configured to provide the inhibitory input to the neuron; and
based on a receipt of the inhibitory input, reduce the efficacy of the one or more inhibitory connections;
wherein the increase and the reduction of the efficacy are configured to modify the efficacy of individual ones of the one or more inhibitory connections.

7. The neural network system of claim 6, wherein the one or more inhibitory neurons are operatively coupled to the neuron via one or more excitatory connections, wherein the plurality of instructions are further configured to, when executed, cause the processor to:
based on the generation of the excitatory output by the neuron, increase a second efficacy of the one or more excitatory connections, the one or more excitatory connections configured to provide an excitatory input to the inhibitory neuron; and
based on the receipt of the inhibitory input, reduce the second efficacy of the one or more excitatory connections.

8. The neural network system of claim 6, wherein:
the excitatory output by the neuron is characterized by an excitatory firing rate; and
for a given value of a parameter associated with the excitatory output, adjust the efficacy of the one or more inhibitory connections so as to substantially equalize the excitatory firing rate of the neuron.

9. The neural network system of claim 8, wherein:
the excitatory firing rate of the neuron is characterized by a firing rate range; and
the equalization of the excitatory firing rate is characterized by a smaller value of the firing rate range compared to a value of the firing rate range in absence of the adjustment of the efficacy.

10. The neural network system of claim 6, wherein the neuron is an individual one of an excitatory network comprising a plurality of neurons configured to generate excitatory outputs.

11. A computerized spiking neuron apparatus comprising one or more processors configured to execute computer program modules, wherein the computer program modules are configured to, when executed, cause the one or more processors to:
based on generation of an output, increase an efficacy of individual ones of one or more inhibitory connections, the one or more inhibitory connections configured to provide an inhibitory input to a neuron; and
based on receipt of the inhibitory input, reduce the efficacy;
wherein:
the inhibitory input comprises an output of one or more inhibitory neurons;
the increase in the efficacy and the reduction in the efficacy cooperate to produce a negative feedback loop between the neuron and individual ones of the one or more inhibitory neurons;
individual ones of the one or more inhibitory connections are associated with the individual ones of the one or more inhibitory neurons; and
the increase in the efficacy and the reduction in the efficacy are configured to modify the efficacy of the individual ones of the one or more inhibitory connections.

12. The apparatus of claim 11, wherein:
the one or more inhibitory connections comprise a strong connection having a first efficacy associated therewith and a weak connection having a second efficacy associated therewith; and
when the second efficacy is smaller than the first efficacy, the increase of the efficacy and the reduction of the efficacy cooperate to increase the second efficacy and to reduce the first efficacy.

13. The apparatus of claim 12, wherein the first efficacy is characterized by a first weight, and the second efficacy is characterized by a second weight, the first weight being greater than the second weight.

14. The apparatus of claim 12, wherein the first efficacy is characterized by a first latency, and the second efficacy is characterized by a second latency, the first latency being smaller than the second latency.

15. The apparatus of claim 11, wherein:
the individual ones of the one or more inhibitory connections are characterized by an activity-based plasticity mechanism comprising:
a pre-synaptic rule configured based on at least the receipt of the inhibitory input prior to the generation of the output;
a post-synaptic rule configured based on at least the generation of the output prior to the receipt of the inhibitory input; and
an adjustment of the efficacy due to the post-synaptic rule being configured to be negatively correlated with a second adjustment of the efficacy due to the pre-synaptic rule.

16. The apparatus of claim 15, wherein the negatively correlated adjustment of the efficacy is characterized by:
the pre-synaptic rule being configured to cause a negative efficacy change; and
the post-synaptic rule being configured to cause a positive efficacy change within at least a time window subsequent to the receipt of the inhibitory input.

17. The apparatus of claim 16, wherein:
the apparatus is configured to process a video sensory input refreshed at least at a 40-millisecond interval; and
the time window is selected from a range of 5 and 20 milliseconds, inclusive.

18. The apparatus of claim 15, wherein the adjustment of the efficacy due to the post-synaptic rule configured to be negatively correlated with the second adjustment of the efficacy is characterized by:
the pre-synaptic rule being configured to cause a negative efficacy change; and
the post-synaptic rule being configured to cause:
the negative efficacy change within at least a time window subsequent to the receipt of the inhibitory stimulus; and
a positive efficacy change subsequent to the at least time window.

\* \* \* \* \*